United States Patent
Yamaguchi et al.

(10) Patent No.: US 9,118,062 B2
(45) Date of Patent: Aug. 25, 2015

(54) ANODE AND METHOD OF MANUFACTURING THE SAME, AND BATTERY AND METHOD OF MANUFACTURING THE SAME

(75) Inventors: Hiroyuki Yamaguchi, Fukushima (JP); Masayuki Ihara, Fukushima (JP); Hideki Nakai, Fukushima (JP); Toru Odani, Fukushima (JP); Tadahiko Kubota, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1368 days.

(21) Appl. No.: 12/135,572

(22) Filed: Jun. 9, 2008

(65) Prior Publication Data

US 2008/0311472 A1    Dec. 18, 2008

(30) Foreign Application Priority Data

Jun. 13, 2007   (JP) .................. 2007-156410

(51) Int. Cl.
| | | |
|---|---|---|
| *H01M 4/02* | (2006.01) | |
| *H01M 4/04* | (2006.01) | |
| *H01M 6/00* | (2006.01) | |
| *H01M 4/1395* | (2010.01) | |
| *H01M 4/134* | (2010.01) | |
| *H01M 4/136* | (2010.01) | |
| *H01M 4/1397* | (2010.01) | |
| *H01M 4/38* | (2006.01) | |
| *H01M 6/16* | (2006.01) | |
| *H01M 10/0568* | (2010.01) | |
| *H01M 10/0569* | (2010.01) | |
| *H01M 10/42* | (2006.01) | |

(52) U.S. Cl.
CPC .......... *H01M 4/1395* (2013.01); *H01M 4/0416* (2013.01); *H01M 4/134* (2013.01); *H01M 4/136* (2013.01); *H01M 4/1397* (2013.01); *H01M 4/38* (2013.01); *H01M 6/164* (2013.01); *H01M 10/0568* (2013.01); *H01M 10/0569* (2013.01); *H01M 10/4235* (2013.01); *H01M 2004/027* (2013.01); *H01M 2300/0034* (2013.01); *Y02E 60/122* (2013.01); *Y10T 29/49115* (2015.01)

(58) Field of Classification Search
USPC ............... 29/623.5; 427/123; 429/218.1, 220, 429/221, 223, 229, 231.1, 231.3, 231.6, 429/231.9, 231.95, 232
See application file for complete search history.

(56) References Cited

U.S. PATENT DOCUMENTS

| | | | |
|---|---|---|---|
| 6,235,427 B1 | 5/2001 | Idota et al. | |
| 6,337,159 B1 * | 1/2002 | Peled et al. ................. | 429/231.4 |
| 6,743,877 B1 * | 6/2004 | Armand et al. ............... | 526/258 |
| 6,790,563 B2 * | 9/2004 | Ishii et al. ..................... | 429/347 |

(Continued)

FOREIGN PATENT DOCUMENTS

| | | |
|---|---|---|
| CN | 1399363 | 2/2003 |
| CN | 1710734 A | 12/2005 |

(Continued)

OTHER PUBLICATIONS

Yoshimura, JP 2007-027105 JPO Abstract translation, Feb. 2007.*

(Continued)

*Primary Examiner* — Yun Qian
(74) *Attorney, Agent, or Firm* — Dentons US LLP

(57) ABSTRACT

A coating on an anode active material that includes a metal salt with two or more sulfonates or a metal salt of oxocarbonic acid.

14 Claims, 11 Drawing Sheets

(56) References Cited

U.S. PATENT DOCUMENTS

| | | | |
|---|---|---|---|
| 7,695,863 B2* | 4/2010 | Abe et al. | 429/200 |
| 2003/0152839 A1* | 8/2003 | Kawai et al. | 429/329 |
| 2004/0072072 A1* | 4/2004 | Suzuki et al. | 429/231.1 |
| 2006/0099512 A1* | 5/2006 | Nakai et al. | 429/246 |
| 2007/0117024 A1* | 5/2007 | Nakai et al. | 429/246 |
| 2007/0122701 A1* | 5/2007 | Yamaguchi | 429/218.1 |
| 2007/0178379 A1* | 8/2007 | Tamura et al. | 429/200 |

FOREIGN PATENT DOCUMENTS

| | | | | |
|---|---|---|---|---|
| JP | 02-262246 | * | 10/1990 | H01M 4/50 |
| JP | 08-078058 | | 3/1996 | |
| JP | 11-265719 | | 9/1999 | |
| JP | 2002-056891 | | 2/2002 | |
| JP | 2003-132946 | | 5/2003 | |
| JP | 2003-203673 | | 7/2003 | |
| JP | 2003-257479 | | 9/2003 | |
| JP | 2005-332606 | | 12/2005 | |
| JP | 2006-86058 | | 3/2006 | |
| JP | 2006-294469 | | 10/2006 | |
| JP | 2007-027105 A | * | 2/2007 | |
| JP | 2007-149535 | | 6/2007 | |
| JP | 2008-308421 | | 12/2008 | |
| WO | WO 2006/070546 | * | 7/2006 | H01M 10/40 |

OTHER PUBLICATIONS

Koch et al. Journal of Power Sources, 20, 1987, 287-291.*
Korean Office Examination Report issued in connection with related Korean Patent Application No. 10-2008-55326 dated Oct. 8, 2014 with English translation.
Chinese Office Examination Report issued in connection with related Chinese Patent Application No. 200810210393.3 dated Aug. 20, 2014.
Chinese Examination Report issued in connection with related counterpart CN Patent Application No. CN 200810210393.3 dated Apr. 1, 2014.
Japanese Office Action dated Mar. 19, 2013 issued in connection with counterpart Japanese Patent Application No. 2008-155787.

* cited by examiner

ANODE AND METHOD OF MANUFACTURING THE SAME, AND BATTERY AND METHOD OF MANUFACTURING THE SAME

CROSS REFERENCES TO RELATED APPLICATIONS

The present invention contains subject matter related to Japanese Patent Application JP 2007-156410 filed in the Japanese Patent Office on Jun. 13, 2007, the entire contents of which being incorporated herein by reference.

BACKGROUND OF THE INVENTION

1. Field of the Invention

The present invention relates to an anode, a method of manufacturing the anode, a battery including the anode, and a method of manufacturing the battery.

2. Description of the Related Art

In recent years, portable electronic devices such as camera-integrated VTRs (videotape recorders), digital steel cameras, cellular phones, personal digital assistances or laptop computers are widely used, and size and weight reduction in the portable electronic devices and an increase in longevity of the portable electronic devices have been strongly demanded. Accordingly, as power sources for the portable electronic devices, the development of batteries, specifically lightweight secondary batteries capable of obtaining a high energy density have been promoted.

Among them, a secondary battery (a so-called lithium-ion secondary battery) using insertion and extraction of lithium for charge-discharge reaction holds great promise, because the secondary battery is capable of obtaining a larger energy density, compared to a lead-acid battery or a nickel-cadmium battery. In the lithium-ion secondary battery, a carbon material is widely used as an anode active material.

Recently, with enhancement of performance in portable electronic devices, a further improvement in capacity is desired, so it is considered to use tin, silicon or the like as an anode active material instead of a carbon material (for example, refer to U.S. Pat. No. 4,950,566). It is because the theoretical capacities of tin (994 mAh/g) and silicon (4199 mAh/g) are much larger than the theoretical capacity of graphite (372 mAh/g), so a remarkable improvement in battery capacity is expected.

However, in a lithium-ion secondary battery with a higher capacity, an anode active material into which lithium is inserted during charge has high activity, so there is an issue that an electrolytic solution is easily decomposed, and lithium is inactivated. Therefore, when charge and discharge are repeated, charge-discharge efficiency declines, thereby it is difficult to obtain sufficient cycle characteristics.

Therefore, to improve battery characteristics such as cycle characteristics, an electrolytic solution including an alkali metal salt of hexafluoroantimonic acid, an alkali metal salt of hexafluorotantalic acid, a fluorocomplex salt such as lithium hexafluoroniobate, lithium hexafluorovanadate, lithium tetrafluoroferrate, lithium pentafluorotitanate or lithium pentafluorozirconate, or a halogeno complex salt such as alkali metal periodic acid salt is used (for example, refer to Japanese Unexamined Patent Application Publication Nos. S58-204478, S63-310568, H03-152879, H06-290808, 2002-047255 and 2003-142154).

Moreover, to improve cycle characteristics, it is considered to form an inert coating on a surface of an anode active material through the use of a lithium compound such as lithium fluoride or lithium carbonate, or an oxide such as silicon oxide or aluminum oxide (for example, refer to Japanese Unexamined Patent Application Publication Nos. 2004-327211, H07-302617, H10-255800, H11-135153, 2005-026230, 2005-142156, 2005-166469 and 2006-185728).

SUMMARY OF THE INVENTION

However, with further enhancement of performance and further expansion of functions in recent portable electronic devices, when charge and discharge of a secondary battery are frequently repeated, an electrolytic solution is decomposed, thereby a discharge capacity easily declines. The decomposition of the electrolytic solution accompanied with charge and discharge is likely to occur specifically in the case where tin, silicon or the like having a high theoretical capacity is used as an anode active material. Therefore, a further improvement in the cycle characteristics of secondary batteries is desired.

In view of the foregoing, it is desirable to provide an anode capable of improving cycle characteristics, a method of manufacturing the anode, a battery including the anode, and a method of manufacturing the battery.

According to an embodiment of the invention, there is provided an anode including an anode current collector; an anode active material arranged on the anode current collector; and a coating arranged on the anode active material layer, in which the coating includes at least one of a metal salt represented by Chemical Formula 1 or a metal salt of oxocarbonic acid. Moreover, according to an embodiment of the invention, there is provided a battery including the above-described anode, a cathode and an electrolytic solution.

Chemical Formula 1

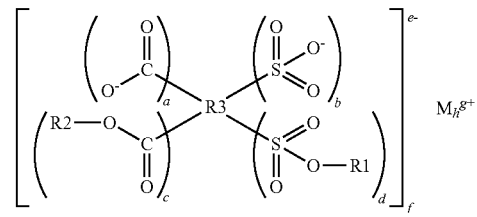

where M represents a metal element, a, b, c and d each are an integer of 0 or more, the sum of a, b, c and d is an integer of 2 or more, the sum of a and b is an integer of 1 or more, e, f, g and h each are an integer of 1 or more, each of R1 and R2 represent a monovalent group, and R3 represents a group having a valence equal to the sum of a, b, c and d.

According to an embodiment of the invention, there is provided a method of manufacturing an anode, the anode including an anode current collector, an anode active material layer arranged on the anode current collector and a coating arranged on the anode active material layer, the method including a step of: forming the coating on the anode active material layer through the use of a solution including at least one of a metal salt represented by Chemical Formula 2 or a metal salt of oxocarbonic acid. Moreover, according to an embodiment of the invention, there is provided a method of manufacturing a battery, the battery including a cathode, an anode and an electrolytic solution, the anode being manufactured as described above.

Chemical Formula 2

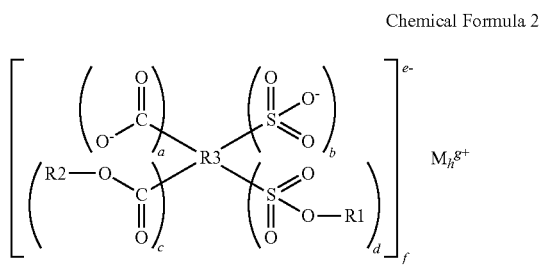

where M represents a metal element, a, b, c and d each are an integer of 0 or more, the sum of a, b, c and d is an integer of 2 or more, the sum of a and b is an integer of 1 or more, e, f, g and h each are an integer of 1 or more, each of R1 and R2 each represent a monovalent group, and R3 represents a group having a valence equal to the sum of a, b, c and d.

In the anode and the method of manufacturing an anode according to the embodiment of the invention, the coating including at least one of the above-described metal salt represented by Chemical Formula 1 (or Chemical Formula 2) or the metal salt of oxocarbonic acid is formed on the anode active material layer, so compared to the case where the coating is not formed, the chemical stability of the anode is improved. Therefore, in the case where the anode is used with an electrolytic solution in an electrochemical device such as a battery, the decomposition reaction of the electrolytic solution is prevented. Thereby, in the battery using the anode according to the embodiment of the invention, and the method of manufacturing the battery, cycle characteristics may be improved.

In this case, the coating is formed through the use of a solution including at least one of the metal salt represented by Chemical Formula 1 (or Chemical Formula 2) or the metal salt of oxocarbonic acid, so compared to the case where a method demanding a specific environment condition such as a reduced pressure environment is used, a good coating may be easily formed. In particular, when the coating includes at least one of an alkali metal salt or an alkaline-earth metal salt, or when an oxide coating is included between the anode active material layer and the coating, a higher effect may be obtained.

Other and further objects, features and advantages of the invention will appear more fully from the following description.

DETAILED DESCRIPTION OF THE PREFERRED EMBODIMENTS

A preferred embodiment will be described in detail below referring to the accompanying drawings.

Figure 1:
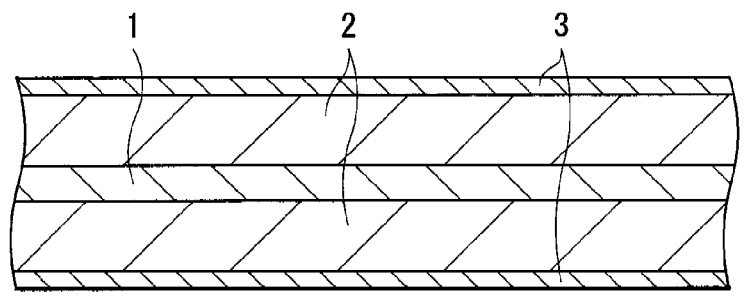
FIG. 1 is a sectional view showing the configuration of an anode according to an embodiment of the invention.

FIG. 1 shows a sectional view of an anode according to an embodiment of the invention. The anode is used in, for example, an electrochemical device such as a battery, and includes an anode current collector 1 having a pair of facing surfaces, an anode active material layer 2 arranged on the anode current collector 1, and a coating 3 arranged on the anode active material layer 2.

The anode current collector 1 is preferably made of a material having good electrochemical stability, electrical conductivity and mechanical strength. Examples of the material include metal materials such as copper (Cu), nickel (Ni) and stainless, because high electrical conductivity is obtained.

The anode active material layer 2 includes one kind or two or more kinds of anode materials capable of inserting and extracting an electrode reactant as anode active materials, and if necessary, the anode active material layer 2 may include an electrical conductor, a binder or the like. The anode active material layer 2 may be formed on both sides or one side of the anode current collector 1.

As the anode material capable of inserting and extracting an electrode reactant, for example, a material which is capable of inserting and extracting an electrode reactant and includes at least one kind selected from the group consisting of metal elements and metalloid elements is cited. Such an anode material is preferably used, because a higher energy density may be obtained. The anode material may be the simple substance, an alloy or a compound of a metal element or a metalloid element, and may include a phase including one kind or two or more kinds selected from them at least in part. In the present invention, the alloy means an alloy including two or more kinds of metal elements as well as an alloy including one or more kinds of metal elements and one or more kinds of metalloid elements. Moreover, the alloy may include a non-metal element. As the texture of the alloy, a solid solution, a eutectic (eutectic mixture), an intermetallic compound or the coexistence of two or more kinds selected from them is cited.

As the metal element or the metalloid element included in the anode material, for example, a metal element or a metalloid element capable of forming an alloy with an electrode reactant is cited. More specifically, examples of the metal element and metalloid element include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) and the like.

Among them, at least one selected from the group consisting of silicon and tin is preferable, because silicon and tin have a high capability of inserting and extracting an electrode reactant, so a high energy density is obtained.

Examples of an anode material including at least one kind selected from the group consisting of silicon and tin include the simple substance, an alloy or a compound of silicon, the simple substance, an alloy or a compound of tin, and a material including a phase of one kind or two or more kinds selected from them at least in part. Only one kind or a mixture of a plurality of kinds selected from them may be used.

As an anode material including the simple substance of silicon, for example, a material including mainly the simple substance of silicon is cited. The anode active material layer 2 including the anode material has, for example, a configuration in which oxygen (O) and a second element except for silicon are present between silicon simple substance layers. The total content of silicon and oxygen in the anode active material layer 2 is preferably 50 wt % or over, and in particular, the content of the simple substance of silicon is preferably 50 wt % or over. Examples of the second element except for silicon include titanium (Ti), chromium (Cr), manganese (Mn), iron, cobalt (Co), nickel, copper, zinc, indium, silver, magnesium (Mg), aluminum, germanium, tin, bismuth, antimony (Sb) and the like. The anode active material layer 2 including a material which includes mainly the simple substance of silicon may be formed by co-evaporating silicon and another element.

As an alloy of silicon, for example, an alloy including at least one kind selected from the group consisting of tin, nickel, copper, iron, cobalt, manganese, zinc, indium, silver, titanium, germanium, bismuth, antimony and chromium as a second element except for silicon is cited. As a compound of silicon, for example, a compound including oxygen or carbon (C) is cited, and a compound of silicon may include the above-described second element in addition to silicon. Examples of the alloy or compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$ $Si_2N_2O$, $SiO_v$ ($0<v\leq2$), $SnO_w$ ($0<w\leq2$), LiSiO and the like.

As an alloy of tin, for example, an alloy including at least one kind selected from the group consisting of silicon, nickel, copper, iron, cobalt, manganese, zinc, indium, silver, titanium, germanium, bismuth, antimony and chromium as a second element except for tin is cited. As a compound of tin, for example, a compound including oxygen or carbon is cited, and the compound of tin may include the above-described second element in addition to tin. Examples of the alloy or compound of tin include $SnSiO_3$, LiSnO, $Mg_2Sn$ and the like.

In particular, as the anode material including at least one kind selected from the group consisting of silicon and tin, for example, an anode material including tin as a first element, and a second element and a third element is preferable. The second element includes at least one kind selected from the group consisting of cobalt, iron, magnesium, titanium, vanadium (V), chromium, manganese, nickel, copper, zinc, gallium, zirconium, niobium (Nb), molybdenum (Mo), silver, indium, cerium (Ce), hafnium, tantalum (Ta), tungsten (W), bismuth and silicon. The third element includes at least one kind selected from the group consisting of boron, carbon, aluminum and phosphorus (P). When the second element and the third element are included, cycle characteristics are improved.

Among them, a SnCoC-containing material in which tin, cobalt and carbon are included as elements, and the carbon content is within a range from 9.9 wt % to 29.7 wt % both inclusive, and the ratio of cobalt to the total of tin and cobalt (Co/(Sn+Co)) is within a range from 30 wt % to 70 wt % both inclusive is preferable, because a high energy density is obtained in such a composition range.

The SnCoC-containing material may include any other element, if necessary. As the element, for example, silicon, iron, nickel, chromium, indium, niobium, germanium, titanium, molybdenum, aluminum, phosphorus, gallium, bismuth or the like is preferable, and two or more kinds selected from them may be included. It is because a higher effect is obtained.

The SnCoC-containing material includes a phase including tin, cobalt and carbon, and the phase preferably has a low crystalline structure or an amorphous structure. Moreover, in the SnCoC-containing material, at least a part of carbon as an element is preferably bonded to a metal element or a metalloid element as another element. It is because cohesion or crystallization of tin or the like is prevented.

The SnCoC-containing material may be formed, for example, by melting a mixture including the materials of all elements in an electric furnace, a high-frequency induction furnace, an arc furnace or the like, and then solidifying the mixture. The SnCoC-containing material may be formed by various atomization methods such as gas atomization or water atomization, various roll methods, or methods using mechanochemical reaction such as a mechanical alloying method or a mechanical milling method. Among them, the method using mechanochemical reaction is preferable. It is because the SnCoC-containing material has a low crystalline structure or an amorphous structure. In the method using mechanochemical reaction, for example, a manufacturing apparatus such as a planetary ball mill or an attritor may be used.

As a measuring method for checking the bonding state of an element, for example, X-ray photoelectron spectroscopy (XPS) is used. In the XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. Moreover, the peak of C1s of the surface contamination carbon is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the SnCoC-containing material is observed in a region lower than 284.5 eV, at least a part of carbon included in the SnCoC-containing material is bonded to the metal element or the metalloid element which is another element.

Moreover, in the XPS measurement, for example, the peak of C1s is used to correct the energy axis of a spectrum. In general, surface contamination carbon exists on a material surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the SnCoC-containing material, so the peak of the surface contamination carbon and the peak of the carbon in the SnCoC-containing material are separated by analyzing the waveform through the use of, for example, commercially available software. In the analysis of the waveform, the position of a main peak existing on a lowest binding energy side is used as an energy reference (284.8 eV).

The anode active material layer 2 including the simple substance, an alloy or a compound of silicon, the simple substance, an alloy or a compound of tin, or a material including a phase including one kind or two or more kinds selected from them at least in part is formed by, for example, a vapor-phase method, a liquid-phase method, a spraying method or a firing method, or a combination of two or more methods selected from them, and the anode active material layer 2 and the anode current collector 1 are preferably alloyed in at least a part of an interface therebetween. More specifically, in the interface, an element of the anode current collector 1 is preferably diffused into the anode active material layer 2, or an element of the anode active material layer 2 is preferably diffused into the anode current collector 1, or they are preferably diffused into each other, because a fracture of the anode active material layer 2 due to swelling and shrinkage thereof according to charge and discharge is prevented, and the electronic conductivity between the anode active material layer 2 and the anode current collector 1 is improved.

As the vapor-phase method, for example, a physical deposition method or a chemical deposition method, more specifically, a vacuum deposition method, a sputtering method, an ion plating method, a laser ablation method, a thermal chemical vapor deposition (CVD) method, a plasma chemical vapor deposition method or the like is used. As the liquid-phase method, a known technique such as electrolytic plating or electroless plating may be used. The firing method is, for example, a method in which a particulate anode active material is mixed with a binder or the like to form a mixture, and the mixture is dispersed in a solvent, and is applied, and then the mixture is heated at a higher temperature than the melting point of the binder or the like. As the firing method, a known technique may be used, and, for example, an atmosphere firing method, a reaction firing method or a hot press firing method is cited.

In addition to the above-described material, as the anode material capable of inserting and extracting an electrode reactant, for example, a carbon material is cited. Examples of such a carbon material include graphitizable carbon, non-graphitizable carbon with a (002) plane interval of 0.37 nm or more, graphite with a (002) plane interval of 0.34 nm or more, and the like. More specifically, kinds of pyrolytic carbon, kinds of coke, glass-like carbon fibers, fired organic polymer compound bodies, activated carbon, kinds of carbon black and the like are cited. Among them, kinds of coke include pitch coke, needle coke, petroleum coke and so on, and the fired organic polymer compound bodies are polymers such as a phenolic resin and a furan resin which are carbonized by firing at an adequate temperature. These carbon materials are preferable, because a change in a crystal structure according to insertion and extraction of lithium is very small, so when the carbon materials are used with another anode material, a high energy density may be obtained, and superior cycle characteristics may be obtained, and the carbon materials also function as electrical conductors. The carbon material may have the form of fibers, balls, particles, or flakes.

In addition, as the anode material capable of inserting and extracting an electrode reactant, for example, a metal oxide or a polymer compound capable of inserting and extracting an electrode reactant is cited. The anode materials and the above-described anode materials may be used together. Examples of the metal oxide include iron oxide, ruthenium oxide, molybdenum oxide and the like, and examples of the polymer compound include polyacetylene, polyaniline, polypyrrole and the like.

As the electrical conductor, for example, a carbon material such as graphite, carbon black, acetylene black or ketjen black is cited. Only one kind or a mixture of a plurality of kinds selected from them may be used. As long as the electrical conductor is a material having electrical conductivity, any metal material or any conductive polymer may be used.

As the binder, for example, synthetic rubber such as styrene butadiene-based rubber, fluorine-based rubber or ethylene propylene diene or a polymer material such as polyvinylidene fluoride is cited. Only one kind or a mixture of a plurality of kinds selected from them may be used.

The coating 3 may be formed so that the whole surface of the anode active material layer 2 or a part of the surface of the anode active material layer 2 is covered with the coating 3. Moreover, the coating 3 may be formed by penetrating into the anode active material layer 2. The coating 3 includes at least one of a metal salt represented by Chemical Formula 3 or a metal salt of oxocarbonic acid. The coating 3 may also include an oxocarbonic acid with an ester bond with the metal salt of oxocarbonic acid.

Chemical Formula 3

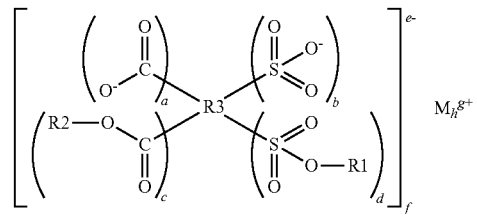

where M represents a metal element, a, b, c and d each are an integer of 0 or more, the sum of a, b, c and d is an integer of 2 or more, the sum of a and b is an integer of 1 or more, e, f, g and h each are an integer of 1 or more, R1 and R2 each represent a monovalent group, and may be bonded to each other to form a ring, and R3 represents a group having a valence equal to the sum of a, b, c and d.

R1 and R2 in Chemical Formula 3 represent, for example, an alkyl group, an alkenyl group, an alkynyl group, a trialkylsilyl group or a halogenated group thereof. Herein, "a halogenated group thereof" means a group in which a halogen group is substituted for at least a part of a hydrogen group. R1 and R2 in Chemical Formula 3 may be the same as or different from each other. In the trialkylsilyl group, alkyl groups adjacent to a silicon atom may be the same as or different from each other. R3 in Chemical Formula 3 is, for example, a hydrocarbon group.

Such a coating 3 contributes to an improvement in the chemical stability of the anode. Therefore, in the case where the anode is used with an electrolytic solution in an electrochemical device such as a battery, an electrode reactant efficiently passes through, and the decomposition of the electrolytic solution is prevented, so cycle characteristics may be improved. In addition, the coating 3 may include the metal salt represented by Chemical Formula 3 or the metal salt of oxocarbonic acid as well as a decomposition product thereof.

Examples of the metal salt of oxocarbonic acid include dilithium squarate or dilithium croconate, a metal salt of oxocarbonic acid including an ester bond such as ethyl lithium squarate or ethyl lithium croconate. In the coating 3, these metal salts of oxocarbonic acid may be arbitrarily mixed to be used.

Moreover, as M represented by Chemical Formula 3, an alkali metal element (a Group 1A element except for hydrogen) or an alkaline-earth element (a Group 2A element) is desirably used. In particular, among alkali metal elements, lithium is preferable, and among alkaline-earth elements, magnesium or calcium is preferable, it is because when lithium, magnesium or calcium is used, a higher effect is obtained.

Examples of the metal salt represented by Chemical Formula 3 are cited as below. Examples of a metal salt in which M is lithium among alkali metal elements include dilithium salts including two sulfonic acid groups such as dilithium methanedisulfonate, dilithium ethanedisulfonate, dilithium propanedisulfonate, dilithium benzenedisulfonate, dilithium naphthalenedisulfonate and bilithium biphenyldisulfonate, dilithium salts including a sulfonic acid group and a carboxylic acid group such as dilithium sulfoacetate, dilithium sulfophenylacetate, dilithium sulfopropionate, dilithium sulfobutanoate and dilithium sulfobenzoate, and dilithium salts including two carboxylic acid groups such as dilithium succinate, dilithium maleate, dilithium fumarate, dilithium itaconate, dilithium mesaconate, dilithium citraconate, dilithium phthalate and dilithium naphthalenedicarboxylate. Moreover, as dilithium salts in which a part is fluorinated, dilithium salt including two sulfonic acid groups such as dilithium tetrafluoroethanedisulfonate, dilithium hexafluoropropanedisulfonate, dilithium tetrafluorosulfopropionate, dilithium hexafluorosulfobutanoate and dilithium tetrafluorosulfobenzoate, and dilithium salts including a sulfonic acid group and a carboxylic acid such as dilithium tetrafluorosuccinate and dilithium tetrafluorophthalate are cited.

Among metal salts represented by Chemical Formula 3, the metal salt in which M is lithium is not limited to the above-described dilithium salts, and a trilithium salt, a tetralithium salt, a pentalithium salt or the like may be used. Examples of the trilithium salt include trilithium disulfobenzoate, trilithium sulfophthalate, trilithium sulfoisophthalate, trilithium sulfoterephthalate, trilithium methanetricarboxylate, trilithium aconitate and the like. Moreover, examples of the tetralithium salt, tetralithium propanetetracarboxylate, tetralithium cyclopentanetetracarboxylate, tetralithium tetrahydrofurantetracarboxylate, tetralithium butanetetracarboxylate, tetralithium benzenetetracarboxylate, tetralithium disulfonaphthalenedicarboxylate, tetralithium naphthalenetetracarboxylate, tetralithium biphenyltetracarboxylate and the like. As the pentalithium salt, pentalithium biphenylsulfotetracarboxylate is cited.

Among the metal salts represented by Chemical Formula 3, as the metal salt in which M is lithium, in addition to the above-described salts, a lithium salt including an ester bond in part may be used. Examples of such a lithium salt include lithium salts including a sulfonic acid group and a silyl sulfonate group such as lithium trimethylsilyl ethanedisulfonate, lithium triethylsilyl ethanedisulfonate, lithium tri-iso-propylsilyl ethanedisulfonate, lithium dimethylethylsilyl ethanedisulfonate, lithium dimethylpropylsilyl ethanedisulfonate, lithium dimethyl-iso-propylsilyl ethanedisulfonate, lithium ethanedisulfonate-tert (tertiary)-butylmethylsilyl, lithium trimethylsilyl propanedisulfonate, lithium triethylsilyl propanedisulfonate, lithium tri-iso-propylsilyl propanedisulfonate, lithium dimethylethylsilyl propanedisulfonate, lithium dimethylpropylsilyl propanedisulfonate, lithium dimethyl-iso-propylsilyl propanedisulfonate, and lithium propanedisulfonate-tert-buthyldimethylsilyl. As a lithium salt including a group formed by silyl esterifying one of a sulfonic acid group and a carboxylic acid group, lithium trimethylsilyl sulfopropionate, lithium triethylsilyl sulfopropionate, lithium tri-iso-propylsilyl sulfopropionate, lithium dimethylethylsilyl sulfopropionate, lithium dimethylpropylsilyl sulfopropionate, lithium dimethyl-iso-propylsilyl sulfopropionate, lithium sulfopropionate-tert-butyldimethylsilyl, lithium trimethylsilyl sulfobenzoate, lithium triethylsilyl sulfobenzoate, lithium tri-iso-propylsilyl sulfobenzoate, lithium dimethylethylsilyl sulfobenzoate, lithium dimethylpropylsilyl sulfobenzoate, lithium dimethyl-iso-propylsilyl sulfobenzoate, lithium sulfobenzoate-tert-butyldimethylsilyl or the like is cited. As a metal salt including a sulfonic acid group and an ethyl sulfonate group, lithium ethyl ethanedisulfonate, lithium ethyl propanedisulfonate or the like is cited, and as a metal salt including a group formed by ethyl esterifying one of a sulfonic acid group and a carboxylic acid group, lithium ethyl sulfopropionate, lithium ethyl sulfobutanoate, lithium ethyl sulfobenzoate, lithium ethyl succinate, lithium ethyl maleate, lithium ethyl fumarate, lithium ethyl phthalate or the like is cited.

Among metal salts represented by Chemical Formula 3, as the metal salt in which M is lithium, in addition to the above-described salts, trilithium sulfosuccinate, dilithium ethylsulfosuccinate, lithium diethylsulfosuccinate or the like may be used.

Although as the metal salts represented by Chemical Formula 3, the metal salts in which M is lithium are cited, M may be sodium (Na), magnesium (Mg), or calcium (Ca). Examples of a sodium salt include disodium salts including two sulfonic acid groups such as disodium ethanedisulfonate, disodium propanedisulfonate, disodium sulfopropionate, disodium sulfobutanoate and disodium sulfobenzoate, and disodium salts including two carboxylic acid groups such as disodium succinate, disodium maleate, disodium fumarate, disodium phthalate, disodium squarate, and disodium croconate. Moreover, as a magnesium salt, magnesium ethanedisulfonate, magnesium propanedisulfonate, magnesium sulfoacetate, magnesium sulfopropionate, magnesium sulfobutanoate, magnesium sulfobenzoate, magnesium succinate, trimagnesium disulfosuccinate, magnesium squarate or the like is cited. Further, as a calcium salt, calcium ethanedisulfonate, calcium propanedisulfonate, calcium sulfoacetate, calcium sulfopropionate, calcium sulfobutanoate, calcium sulfobenzoate, calcium succinate, tricalcium disulfosuccinate, calcium squarate, or the like is cited.

The above-described salts as the metal salts represented by Chemical Formula 3 may be arbitrarily mixed to be used in the coating 3.

Moreover, the coating 3 preferably includes an alkali metal salt or an alkaline-earth metal salt in addition to the above-described compound, and among them, another lithium metal is preferably included. It is because coating resistance is reduced, and cycle characteristics may be further improved. Examples of another alkali metal salt or another alkaline-earth metal salt include a carbonate of an alkali metal element or an alkaline-earth metal element, a halide salt, a borate salt, a phosphate and the like. As specific examples, lithium carbonate ($Li_2CO_3$), lithium fluoride (LiF), lithium tetraborate ($Li_2B_4O_7$), lithium metaborate ($LiBO_2$), lithium pyrophosphate ($Li_4P_2O_7$), lithium tripolyphosphate ($Li_5P_3O_{10}$), lithium orthosilicate ($Li_4SiO_4$), lithium metasilicate ($Li_2SiO_3$) and the like are cited. A mixture of them may be used.

Examples of a method of forming the coating 3 include a liquid-phase method such as a coating method, a immersion method or a dip coating method, a vapor-phase method such as an evaporation method, a sputtering method and a CVD (Chemical Vapor Deposition) method. Only one or two or more kinds selected from them may be used.

Among them, as the liquid-phase method, the coating 3 is preferably formed through the use of a solution including at least one of the metal salts represented by Chemical Formula 3 or the metal salts of oxocarbonic acid. More specifically, for example, in the immersion method, the anode current collector 1 on which the anode active material layer 2 is formed is immersed in a solution including the above-described compound to form the coating 3, or in the coating method, the above-described solution is applied to the anode active material layer 2 to form the coating 3. It is because a good coating 3 with high chemical stability may be easily formed. As a solvent in which the metal salt represented by Chemical Formula 3 is dissolved, for example, a solvent with a high polarity such as water is cited.

The anode is manufactured by the following steps, for example.

At first, the anode active material layer 2 is formed on both sides of the anode current collector 1. When the anode active material layer 2 is formed, for example, a mixture of the powder of the anode active material, an electrical conductor and a binder is dispersed in a solvent to form a paste-form anode mixture slurry, and the anode mixture slurry is applied to the anode current collector 1, and is dried, and then the anode mixture slurry is compression molded. Next, the coating 3 is formed on a surface of the anode active material layer 2. When the coating 3 is formed, for When the coating 3 is formed, for example, as a solution including at least one of the metal salts represented by Chemical Formula 3 or the metal salts of oxocarbonic acid, a solution with a concentration of 1 wt % to 5 wt % both inclusive is prepared, and the anode current collector 1 on which the anode active material layer 2 is formed is immersed in the above-described solution for a few seconds, and then the anode current collector 1 is taken out of the solution, and the anode current collector 1 is dried at room temperature. Alternatively, the above-described solution is prepared, and the solution is applied to the surface of the anode active material layer 2, and then the anode active material layer 2 is dried. Thereby the anode is completed.

In the anode and the method of manufacturing the anode, the coating 3 including at least one of the metal salts represented by Chemical Formula 3 or the metal salts of oxocarbonic acid is formed on the anode active material layer 2, so compared to the case where the coating 3 is not formed, the chemical stability of the anode is improved. Therefore, in the case where the anode is used with an electrolytic solution in an electrochemical device such as a battery, the decomposition reaction of the electrolytic solution is prevented, so the anode may contribute to an improvement in cycle characteristics. In this case, a simple process such as an immersion process or coating process using a solution including at least one of the metal salts represented by Chemical Formula 3 or the metal salts of oxocarbonic acid is used, so compared to the case where a method in which a special environmental condition such as a reduced pressure environment is necessary is used, a good coating 3 may be easily formed.

In particular, the coating 3 preferably includes, as the metal salt represented by Chemical Formula 3 or the metal salt of oxocarbonic acid, dilithium ethanedisulfonate, dilithium propanedisulfonate, dilithium sulfoacetate, dilithium sulfopropionate, dilithium sulfobutanoate, dilithium sulfobenzoate, dilithium succinate, trilithium sulfosuccinate or dilithium squarate represented by Chemical Formulas 4(1) to 4(9), respectively, magnesium ethanedisulfonate, magnesium propanedisulfonate, magnesium sulfoacetate, magnesium sulfopropionate, magnesium sulfobutanoate, magnesium sulfobenzoate, magnesium succinate or trimagnesium disulfosuccinate represented by Chemical Formulas 6(1) to 5(8), respectively, calcium ethanedisulfonate, calcium propanedisulfonate, calcium sulfoacetate, calcium sulfopropionate, calcium sulfobutanoate, calcium sulfobenzoate, calcium succinate or tricalcium disulfosuccinate represented by Chemical Formulas 6(1) to 6(8), respectively, because a higher effect may be obtained.

Chemical Formula 4

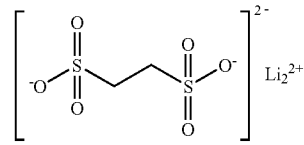
(1)

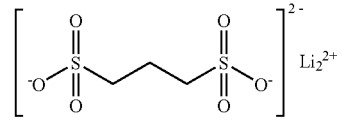
(2)

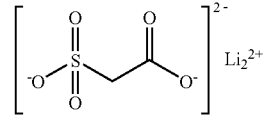
(3)

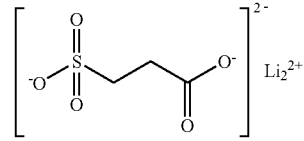
(4)

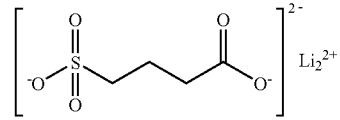
(5)

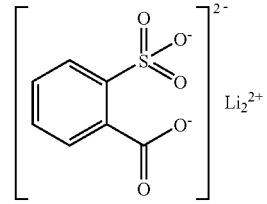
(6)

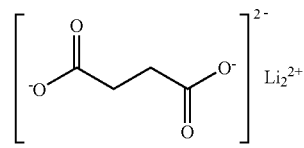
(7)

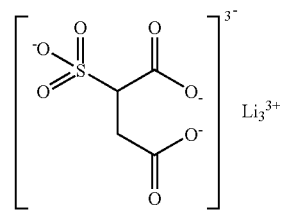
(8)

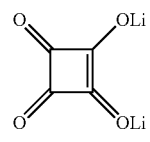
(9)

Chemical Formula 5

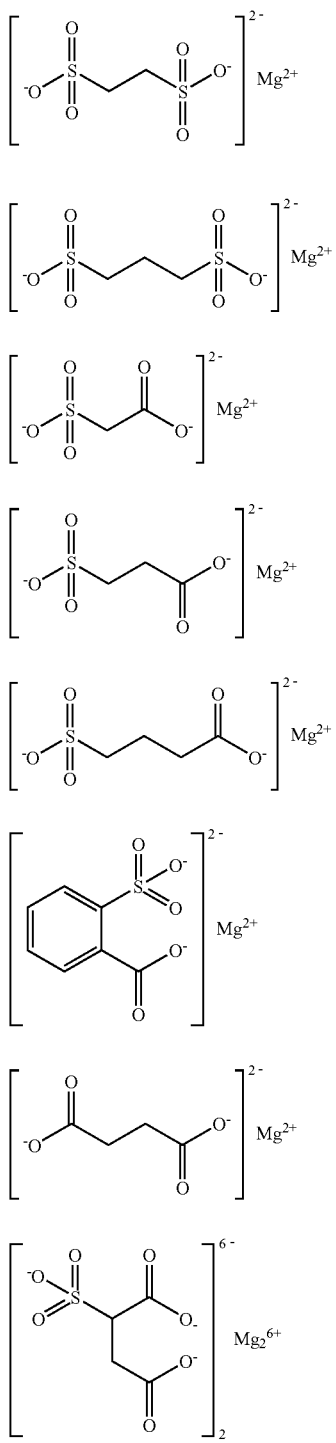

Chemical Formula 6

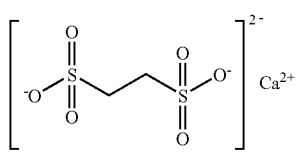

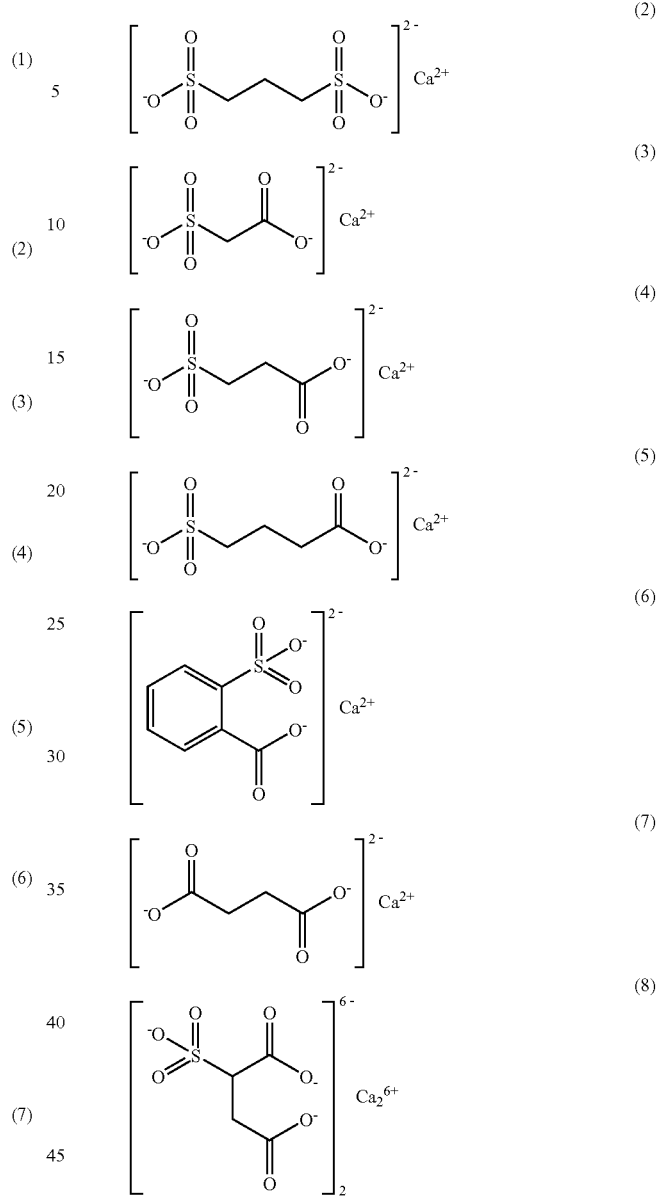

Moreover, when the coating 3 further includes an alkali metal salt or an alkaline-earth metal salt, a higher effect may be obtained.

First Modification

Figure 2:
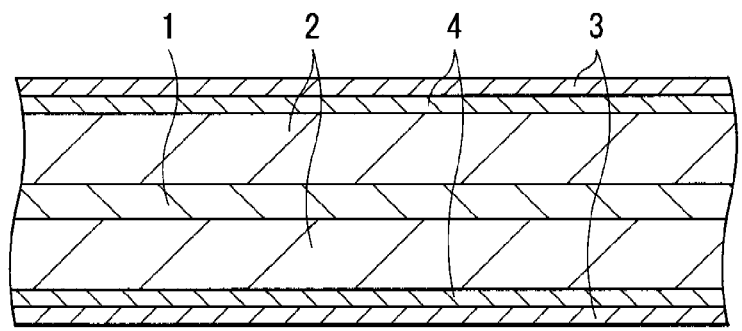
FIG. 2 is a sectional view showing a first modification of the anode according to the embodiment of the invention.

FIG. 2 shows a first modification of the anode, and FIG. 2 is a sectional view corresponding to FIG. 1. The anode has the same configuration as that of the anode shown in FIG. 1, except that an oxide coating 4 is included between the anode active material layer 2 and the coating 3.

The oxide coating 4 may be formed so that the whole surface of the anode active material layer 2 or a part of the surface of the anode active material layer 2 is covered with the oxide coating 4. Moreover, the oxide coating 4 may be formed by penetrating into the anode active material layer 2. The oxide coating 4 including an oxide of a metal or a metalloid. As the oxide of a metal or a metalloid, at least one kind of oxide selected from the group consisting of an oxide of silicon, an oxide of germanium and an oxide of tin is preferable. It is because the chemical stability of the anode is improved.

As the oxide, for example, an oxide of aluminum or zinc is cited in addition to the above-described oxides. As a method of forming the oxide coating 4, for example, a liquid-phase method such as a liquid-phase deposition method, a sol-gel method, a polysilazane method, an electrodeposition method or a dip coating method, or a vapor-phase method such as an evaporation method, a sputtering method or a CVD method is cited. Among them, the liquid-phase deposition method is preferable. It is because while easily controlling the oxide, the oxide coating 4 may be formed.

The anode is manufactured by the following steps, for example. At first, by the same steps as those in the above-described method of manufacturing the anode, the anode active material layer 2 is formed on both sides of the anode current collector 1. Next, a mixture solution formed by adding and mixing a dissolved species which easily coordinates fluorine as an anion trapping agent in a solution of a metal or metalloid fluoride complex is prepared. Next, the anode current collector 1 on which the anode active material layer 2 is formed is immersed in the mixture solution, and then a fluorine anion generated from the fluoride complex is trapped by the dissolved species, thereby an oxide is deposited on the surface of the anode active material layer 2. After that, the anode active material layer 2 is rinsed, and dried to form the oxide coating 4. Finally, by the same steps as those in the above-described method of manufacturing the anode, the coating 3 is formed on the oxide coating 4. Thereby, the anode is completed.

In the anode of the first modification, the oxide coating 4 is formed between the anode active material layer 2 and the coating 3, so compared to the case where the oxide coating 4 is not formed, the chemical stability of the anode is further improved. Therefore, in the case where the anode of the first modification is used in an electrochemical device such as a battery, the cycle characteristics may be improved.

Second Modification

Figure 3:
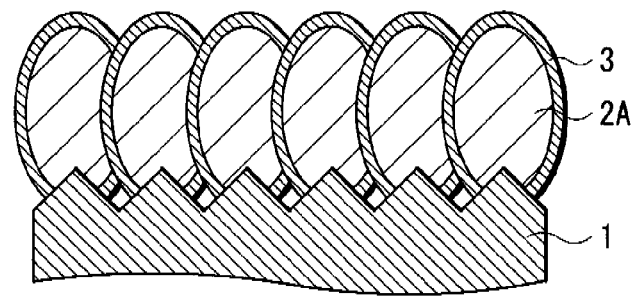
FIG. 3 is a sectional view showing a second modification of the anode according to the embodiment of the invention.

As shown in FIG. 3, the anode active material layer 2 may be an aggregate of a plurality of anode active material particles 2A made of the above-described anode active material. FIG. 3 shows an enlarged schematic sectional view of a part of the anode. The above-described coating 3 is formed on the surface of each anode active material particle 2A. It is desirable that the coating 3 is applied to the widest possible range of the surface of each anode active material particle 2A, and in particular, as shown in FIG. 3, it is desirable to cover the whole surface of the anode active material particle 2A with the coating 3.

The anode active material particles 2A are formed by, for example, a vapor-phase method, a liquid-phase method, a spraying method or a firing method, or a combination of two or more methods selected from them. In particular, the vapor-phase method is preferably used, because the anode current collector 1 and the anode active material particles 2A are easily alloyed in an interface therebetween. Alloying may be achieved by diffusing an element of the anode current collector 1 into the anode active material particles 2A, or diffusing an element of the anode active material particles 2A into the anode current collector 1. Alternatively, alloying may be achieved by diffusing an element of the anode current collector 1 and silicon as an element of the anode active material particles 2A into each other. By such alloying, a structural fracture of the anode active material particles 2A due to swelling and shrinkage during charge and discharge is prevented, and electrical conductivity between the anode current collector 1 and the anode active material particles 2A is improved.

As the vapor-phase method, for example, a physical deposition method or a chemical deposition method may be used, and more specifically, a vacuum deposition method, a sputtering method, an ion plating method, a laser ablation method, a thermal chemical vapor deposition (CVD) method, a plasma chemical vapor deposition method, a spraying method or the like is used. As the liquid-phase method, a known technique such as electrolytic plating or electroless plating may be used. The firing method is, for example, a method in which a particulate anode active material is mixed with a binder or the like to form a mixture, and the mixture is dispersed in a solvent, and is applied, and then the mixture is heated at a higher temperature than the melting point of the binder or the like. As the firing method, a known technique may be used, and, for example, an atmosphere firing method, a reaction firing method or a hot press firing method is cited.

The anode active material particles 2A may have a multilayer configuration formed by laminating a plurality of layers. In this case, it is desirable to arrange the coating 3 in at least a part of each interface between a plurality of layers. When the anode active material particles 2A have such a multilayer configuration, a film formation step may be divided into a plurality of steps, so, for example, in the case where an evaporation method or the like accompanied by high heat during deposition is used, compared to the case where the anode active material particles 2A with a single-layer configuration is formed by one film formation step, the time that the anode current collector 1 is exposed to high heat may be reduced, and damage to the anode current collector 1 may be reduced.

In the anode active material layer 2, a metal is preferably formed in gaps between adjacent anode active material particles 2A. The metal is a metal element not alloyed with an electrode reactant. As the metal element, at least one kind selected from the group consisting of iron (Fe), cobalt (Co), nickel (Ni), zinc (Zn) and copper (Cu) is cited. By such a configuration, the anode active material particles 2A are adhered by the metal. As a result, the pulverization of the anode active material particles 2A or falling of the anode active material particles 2A from the anode current collector 1 is less likely to occur. As a result, the electrical conductivity between the anode current collector 1 and the anode active material particles 2A is further improved.

To improve adhesion, it is desirable that gaps between adjacent anode active material particles 2A are sufficiently filled with the above-described metal. In this case, a part of gaps may be filled; however, the more the amount of the metal is filled, the more preferable it is. It is because adhesion in the anode active material layer 2 is further improved.

Moreover, such a metal may be fixed not only in gaps between the anode active material particles 2A but also on the surfaces of the anode active material particles 2A. It is because the surface areas of the anode active material particles 2A are reduced, and the formation of an irreversible coating which may hinder the progress of electrode reaction may be prevented. For example, in the case where the anode active material particles 2A are formed by a vapor-phase method or the like, small stubble-shaped projections are formed on the surfaces of the anode active material particle 2A, so a large number of gaps between the projections are formed. The gaps causes an increase in the surface areas of the anode active material particles 2A; however, when the above-described metal is arranged in advance, in the case where the anode functions as an anode in an electrochemical device such as a battery, irreversible coatings formed on the surfaces of the anode active material particles 2A are reduced.

Gaps between adjacent anode active material particles 2A may be filled with such a metal by a liquid-phase method or the like.

In the case where the anode of the second modification is used in an electrochemical device such as a battery, the cycle characteristics may be improved.

Next, application examples of the above-described anode will be described below. As an example of the electrochemical device, a battery is used, and the anode is used in the battery as below.

First Battery

Figure 4:
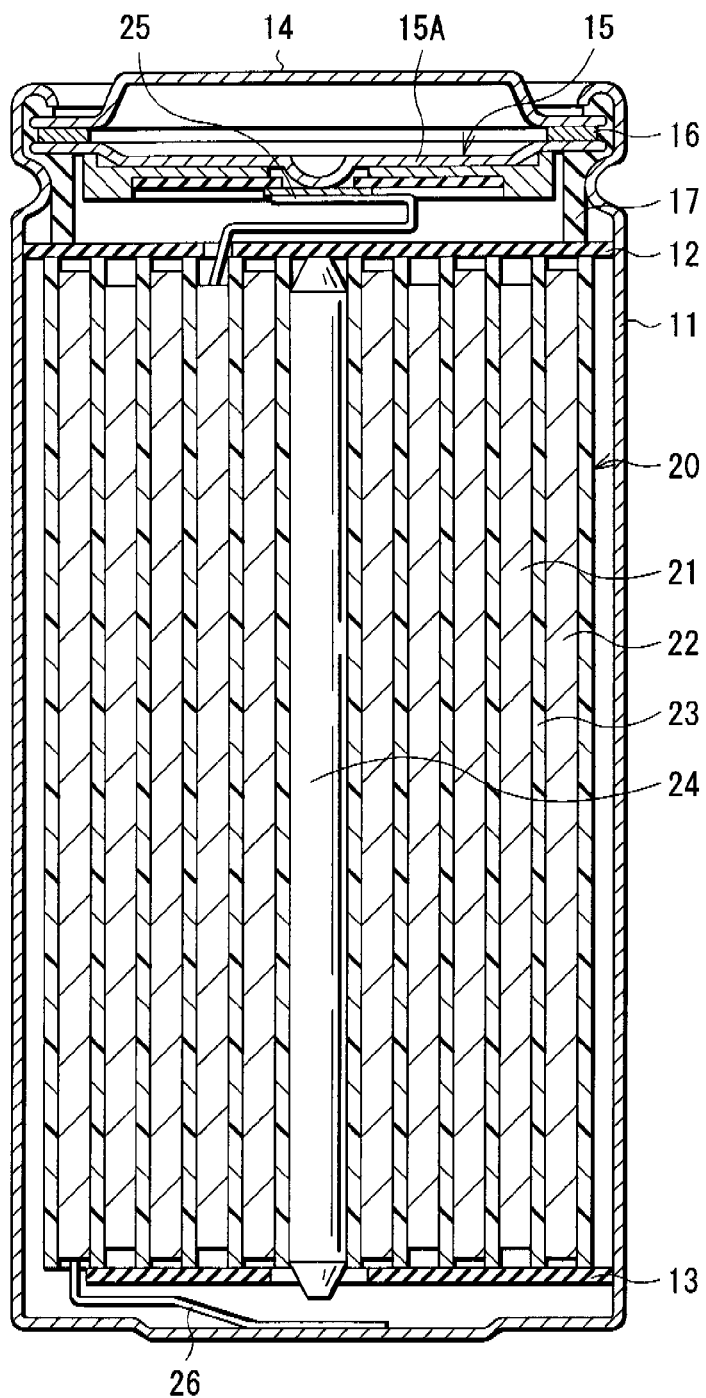
FIG. 4 is a sectional view showing the configuration of a first battery using the anode according to the embodiment of the invention.

FIG. 4 shows a sectional view of a first battery. The battery is, for example, a lithium-ion secondary battery in which the capacity of an anode 22 is represented by a capacity component based on insertion and extraction of lithium as an electrode reactant.

The first battery includes a spirally wound electrode body 20 which includes a cathode 21 and an anode 22 spirally wound with a separator 23 in between and a pair of insulating plates 12 and 13 in a substantially hollow cylindrical-shaped battery can 11. The battery can 11 is made of, for example, nickel-plated iron. An end of the battery can 11 is closed, and the other end thereof is opened. The pair of insulating plates 12 and 13 are arranged so that the spirally wound electrode body 20 is sandwiched therebetween, and the pair of insulating plates 12 and 13 extends in a direction perpendicular to a peripheral winding surface. A battery configuration using the battery can 11 is called a so-called cylindrical type.

In the open end of the battery can 11, a battery cover 14, and a safety valve mechanism 15 and a positive temperature coefficient device (PTC device) 16 arranged inside the battery cover 14 are mounted by caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16. In the safety valve mechanism 15, when an internal pressure in the battery increases to a certain extent or higher due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance to prevent abnormal heat generation caused by a large current. The gasket 17 is made of, for example, an insulating material, and its surface is coated with asphalt.

A center pin 24 is inserted into the center of the spirally wound electrode body 20. In the spirally wound electrode body 20, a cathode lead 25 made of aluminum or the like is connected to the cathode 21, and an anode lead 26 made of nickel or the like is connected to the anode 22. The cathode lead 25 is welded to the safety valve mechanism 15 so as to be electrically connected to the battery cover 14, and the anode lead 26 is welded to the battery can 11 so as to be electrically connected to the battery can 11.

Figure 5:
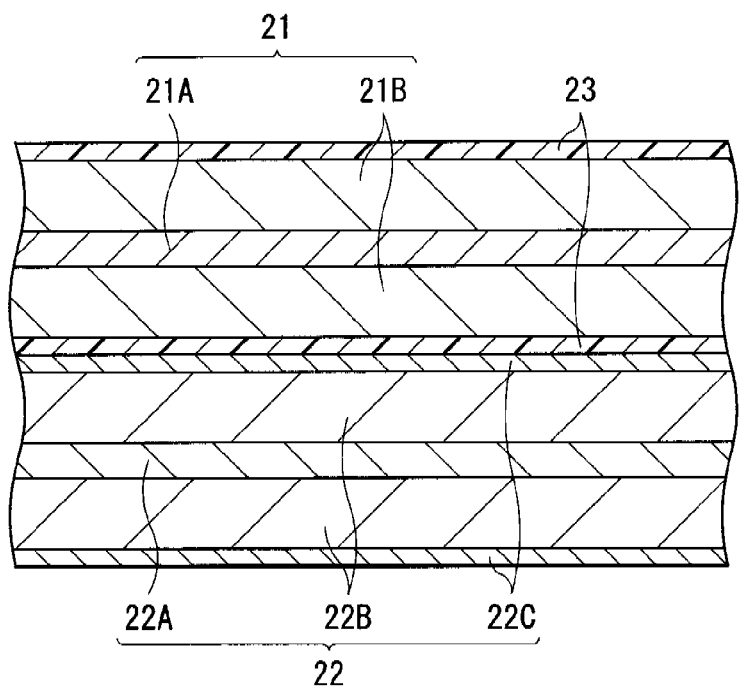
FIG. 5 is an enlarged sectional view of a part of a spirally wound electrode body shown in FIG. 4.

FIG. 5 shows an enlarged view of a part of the spirally wound electrode body 20 shown in FIG. 4. The cathode 21 is formed by arranging a cathode active material layer 21B on both sides of a cathode current collector 21A having a pair of facing surfaces. The cathode current collector 21A is made of, for example, a metal material such as aluminum, nickel or stainless. For example, as a cathode active material, the cathode active material layer 21B includes one kind or two or more kinds of cathode materials capable of inserting and extracting lithium as an electrode reactant, and may include an electrical conductor, a binder or the like, if necessary. However, in the case where the binder is included, and as shown in FIG. 5, the cathode 21 and the anode 22 are spirally wound, as the binder, flexible styrene butadiene-based rubber or fluorine-based rubber is preferably used.

As the cathode material capable of inserting and extracting lithium, for example, a lithium-containing compound is preferable, because a high energy density is obtained. As the lithium-containing compound, for example, a complex oxide including lithium and a transition metal element or a phosphate compound including lithium and a transition metal element is cited, and in particular, as the transition metal element, at least one kind selected from the group consisting of cobalt, nickel, manganese and iron is preferably included, because a higher voltage is obtained. The complex oxide or the phosphate compound is represented by, for example, $Li_xM1O_2$ or $Li_yM2PO_4$. In the chemical formula, M1 and M2 represent one or more kinds of transition metal elements. The values of x and y depend on a charge-discharge state of the battery, and are generally within a range of $0.05 \le x \le 1.10$ and $0.05 \le y \le 1.10$, respectively.

Examples of the lithium complex oxide including lithium and a transition metal element include lithium-cobalt complex oxide ($Li_xCoO_2$), lithium-nickel complex oxide ($Li_xNiO_2$), lithium-nickel-cobalt complex oxide ($Li_xNi_{(1-z)}Co_zO_2$ (z<1)), lithium-nickel-cobalt-manganese complex oxide ($Li_xNi_{(1-v-w)}Co_vMn_wO_2$ (v+w<1)), lithium-manganese complex oxide ($LiMn_2O_4$) having a spinel structure and the like. Among them, a complex oxide including nickel is preferable. It is because a high capacity is obtained, and superior cycle characteristics are obtained. Examples of the phosphate compound including lithium and a transition metal element include a lithium-iron phosphate compound ($LiFePO_4$), a lithium-iron-manganese phosphate compound ($LiFe_{(1-u)}Mn_uPO_4$ (u<1)) and the like.

In addition to the above-described materials, for example, an oxide such as titanium oxide, vanadium oxide or manganese dioxide, a bisulfide such as iron bisulfide, titanium bisulfide or molybdenum sulfide, a chalcogenide such as niobium selenide, sulfur, or a conductive polymer such as polyaniline or polythiophene is cited.

The anode 22 has the same configuration as that of the anode shown in FIG. 1, and is formed by arranging an anode active material layer 22B and a coating 22C on both sides of a strip-shaped anode current collector 22A. The configurations of the anode current collector 22A, the anode active material layer 22B and the coating 22C are the same as those of the anode current collector 1, the anode active material layer 2 and the coating 3 which are described above, respectively.

In the first secondary battery, the amounts of the cathode active material and the anode active material capable of inserting and extracting lithium are adjusted so that the charge capacity of the above-described anode active material is larger than the charge capacity by the cathode active material, thereby the deposition of lithium metal on the anode 22 when the secondary battery was fully charged is prevented.

The separator 23 isolates between the cathode 21 and the anode 22 so that lithium ions pass therethrough while preventing a short circuit of a current due to contact between the cathode 21 and the anode 22. The separator 23 is made of, for example, a porous film of a synthetic resin such as polytetrafluoroethylene, polypropylene or polyethylene, or a porous ceramic film, and the separator 23 may have a configuration in which two or more kinds of the porous films are laminated. Among them, a porous film made of polyolefin is preferable, because a short-circuit preventing effect is superior, and the safety of the battery by a shutdown effect may be improved. In particular, polyethylene is preferable, because a shutdown effect may be obtained within a range from 100° C. to 160° C. both inclusive, and electrochemical stability is superior. Moreover, polypropylene is preferable, and any other resin having chemical stability may be used by copolymerizing or blending with polyethylene or polypropylene.

The separator 23 is impregnated with an electrolytic solution as a liquid electrolyte. The electrolytic solution includes a solvent and an electrolyte salt dissolved in the solvent.

The solvent includes, for example, a nonaqueous solvent such as an organic solvent. Examples of the nonaqueous solvent include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide, dimethyl sulfoxide phosphate and the like. Only one kind or a mixture of a plurality of kinds selected from them may be used. Among them, the solvent preferably includes at least one kind selected from the group consisting of ethylene carbonate, propylene carbonate, dimethyl carbonate, diethyl carbonate and ethyl methyl carbonate. It is because sufficient cycle characteristics are obtained. In this case, in particular, the solvent preferably includes a mixture of a high-viscosity (high-permittivity) solvent (for example, relative permittivity ε≥30) such as ethylene carbonate or propylene carbonate and a low-viscosity solvent (for example, viscosity ≤1 mPa·s) such as dimethyl carbonate, ethyl methyl carbonate or diethyl carbonate. It is because the dissociation property of the electrolyte salt and ion mobility are improved, so a higher effect is obtained.

The solvent preferably includes a cyclic carbonate including an unsaturated bond, because the cycle characteristics are improved. The content of the cycle carbonate including an unsaturated bond in the solvent is preferably within a range from 0.01 wt % to 10.0 wt % both inclusive, because a sufficient effect is obtained. Examples of the cyclic carbonate including an unsaturated bond include vinylene carbonate, vinyl ethylene carbonate and the like. Only one kind or a mixture of a plurality of kinds selected from them may be used.

Moreover, the solvent preferably includes at least one kind selected from the group consisting of a chain carbonate represented by Chemical Formula 7 which includes a halogen as an element and a cyclic carbonate represented by Chemical Formula 8 which includes a halogen as an element, because the cycle characteristics are further improved.

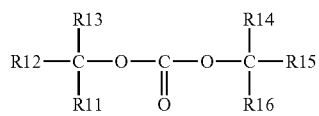

Chemical Formula 7 where R11, R12, R13, R14, R15 and R16 each represent a hydrogen group, a halogen group, an alkyl group or a halogenated alkyl group, and may be the same as or different from one another, and at least one of them is a halogen group or a halogenated alkyl group, and the halogen is at least one kind selected from the group consisting of fluorine, chlorine and bromine.

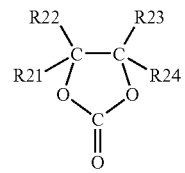

Chemical Formula 8 where R21, R22, R23 and R24 each represent a hydrogen group, a halogen group, an alkyl group or a halogenated alkyl group, and may be the same as or different from one another, and at least one of them is a halogen group or a halogenated alkyl group, and the halogen is at least one kind selected from the group consisting of fluorine, chlorine and bromine.

Examples of the chain carbonate represented by Chemical Formula 7 which includes a halogen include fluoromethyl methyl carbonate, bis(fluoromethyl)carbonate, difluoromethyl methyl carbonate and the like. Only one kind or a mixture of a plurality of kinds selected from them may be used. Among them, bis(fluoromethyl)carbonate is preferable, because a sufficient effect is obtained. In particular, when bis(fluoromethyl)carbonate is used with the cyclic carbonate represented by Chemical Formula 8 which includes a halogen, a higher effect is obtained.

Examples of the cyclic carbonate represented by Chemical Formula 8 which includes a halogen include compounds represented by Chemical Formulas 9 and 10. More specifically, 4-fluoro-1,3-dioxolane-2-one in Chemical Formula 9(1), 4-chloro-1,3-dioxolane-2-one in Chemical Formula 9(2), 4,5-difluoro-1,3-dioxolane-2-one in Chemical Formula 9(3), tetrafluoro-1,3-dioxolane-2-one in Chemical Formula 9(4), 4-fluoro-5-chloro-1,3-dioxolane-2-one in Chemical Formula 9(5), 4,5-dichloro-1,3-dioxolane-2-one in Chemical Formula 9(6), tetrachloro-1,3-dioxolane-2-one in Chemical Formula 9(7), 4,5-bistrifluoromethyl-1,3-dioxolane-2-one in Chemical Formula 9(8), 4-trifluoromethyl-1,3-dioxolane-2-one in Chemical Formula 9(9), 4,5-difluoro-4,5-dimethyl-1,3-dioxolane-2-one in Chemical Formula 9(10), 4-methyl-5,5-difluoro-1,3-dioxolane-2-one in Chemical Formula 9(11), 4-ethyl-5,5-difluoro-1,3-dioxolane-2-one in Chemical Formula 9(12) and the like are cited. Further, 4-trifluoromethyl-5-fluoro-1,3-dioxolane-2-one in Chemical Formula 10(1), 4-trifluoromethyl-5-methyl-1,3-dioxolane-2-one in Chemical Formula 10(2), 4-fluoro-4,5-dimethyl-1,3-dioxolane-2-one in Chemical Formula 10(3), 4,4-difluoro-5-(1,1-difluoroethyl)-1,3-dioxolane-2-one in Chemical Formula 10(4), 4,5-dichloro-4,5-dimethyl-1,3-dioxolane-2-one in Chemical Formula 10(5), 4-ethyl-5-fluoro-1,3-dioxolane-2-one in Chemical Formula 10(6), 4-ethyl-4,5-difluoro-1,3-dioxolane-2-one in Chemical Formula 10(7), 4-ethyl-4,5,5-trifluoro-1,3-dioxolane-2-one in Chemical Formula 10(8), 4-fluoro-4-trifluoromethyl-1,3-dioxolane-2-one in Chemical Formula 10(9) and the like are cited. Only one kind or a mixture of a plurality of kinds selected from them may be used. Among them, at least one kind selected from 4-fluoro-1,3-dioxolane-2-one and 4,5-difluoro-1,3-dioxolane-2-one is preferable, and 4,5-difluoro-1,3-dioxolane-2-one is more preferable. It is because they are easily available, and a higher effect is obtained. In particular, as 4,5-difluoro-1,3-dioxolane-2-one, a trans-isomer is more preferable than a cis-isomer.

Chemical Formula 9
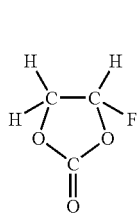 (1)
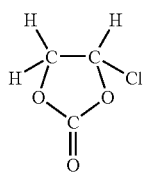 (2)
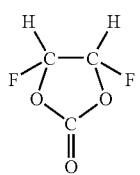 (3)
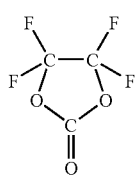 (4)
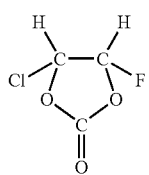 (5)
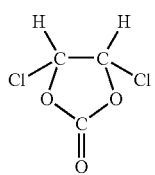 (6)
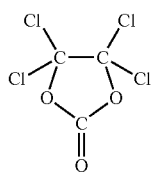 (7)
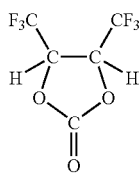 (8)
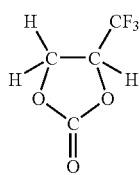 (9)
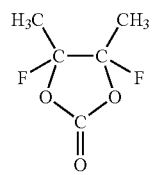 (10)
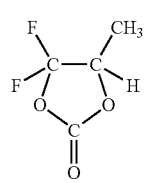 (11)
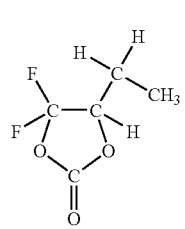 (12)
Chemical Formula 10
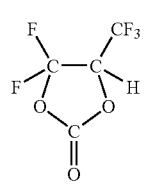 (1)
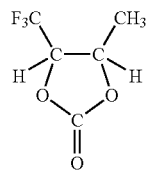 (2)
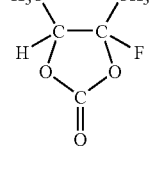 (3)
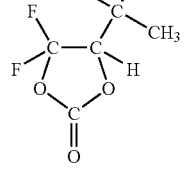 (4)
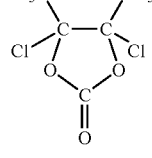 (5)

-continued

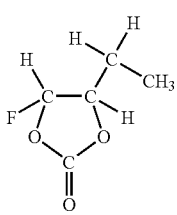
(6)

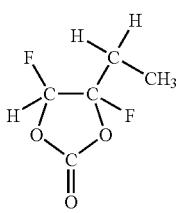
(7)

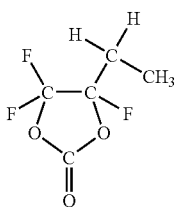
(8)

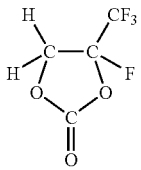
(9)

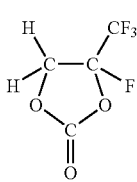
(9)

Moreover, the solvent preferably includes a sultone (a cyclic sulfonate) or an acid anhydride. It is because the cycle characteristics are improved. As the sultone, for example, propane sultone, propene sultone or the like is cited. Only one kind or mixture of a plurality of kinds selected from them may be used. Among them, propene sultone is preferable, because a sufficient effect is obtained. On the other hand, as the acid anhydride, for example, a carboxylic anhydride such as succinic anhydride, a disulfonic anhydride such as ethanedisulfonic anhydride, an anhydride of a carboxylic acid and a sulfonic acid such as sulfobenzoic anhydride or the like is cited. Only one kind or mixture of a plurality of kinds selected from them may be used. Among them, succinic anhydride or sulfobenzoic anhydride is preferable, because a sufficient effect is obtained.

For example, the electrolyte salt includes one kind or two or more kinds of light metal salts such as lithium salt. As the lithium salt, for example, at least one kind selected from the group consisting of lithium hexafluorophosphate, lithium tetrafluoroborate, lithium perchlorate and lithium hexafluoroarsenate is cited. It is because sufficient cycle characteristics are obtained. Only one kind or mixture of a plurality of kinds selected from them may be used. Among them, lithium hexafluorophosphate is preferable, because internal resistance declines, so a higher effect is obtained.

Moreover, the electrolyte salt preferably includes at least one kind selected from the group consisting of compounds represented by Chemical Formulas 11, 12 and 13, because the cycle characteristics are further improved. Only one kind or a mixture of a plurality of kinds selected from them may be used. In particular, when the electrolyte salt includes the above-described lithium hexafluorophosphate or the like and at least one kind selected from the group consisting of compounds represented by Chemical Formulas 11 to 13, a higher effect is obtained.

Chemical Formula 11

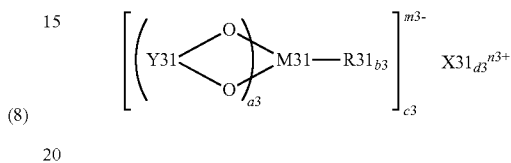

where X31 represents a Group 1A element or a Group 2A element in the short form of the periodic table of the elements, or aluminum (Al), M31 represents a transition metal element, or a Group 3B element, a Group 4B element or a Group 5B element in the short form of the periodic table of the elements, R31 represents a halogen group, Y31 represents —OC—R32-CO—, —OC—CR33$_2$- or —OC—CO—, in which R32 represents an alkylene group, a halogenated alkylene group, an arylene group or a halogenated arylene group, R33 represents an alkyl group, a halogenated alkyl group, an aryl group or a halogenated aryl group, and may be the same as or different from each other, and a3 is an integer of 1 to 4 both inclusive, and b3 is 0 or an integer of 2 or 4, and c3, d3, m3 and n3 each are an integer of 1 to 3 both inclusive.

Chemical Formula 12

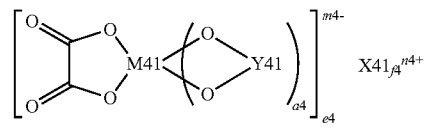

where X41 represents a Group 1A element or a Group 2A element in the short form of the periodic table of the elements, M41 represents a transition metal element, or a Group 3B element, a Group 4B element or a Group 5B element in the short form of the periodic table of the elements, Y41 represents —OC—(CR41$_2$)$_{b4}$-CO—, —R43$_2$C—(CR42$_2$)$_{c4}$-CO—, —R43$_2$C—(CR42$_2$)$_{c4}$-CR43$_2$-, —R43$_2$C—(CR42$_2$)$_{c4}$-SO$_2$—, —O$_2$S—(CR42$_2$)$_{d4}$-SO$_2$— or —OC—(CR42$_2$)$_{d4}$-SO$_2$—, in which R41 and R43 each represents a hydrogen group, an alkyl group, a halogen group or a halogenated alkyl group, and may be the same as or different from each other, but at least one of them is a halogen group or a halogenated alkyl group, R42 represents a hydrogen group, an alkyl group, a halogen group or a halogenated alkyl group, and may be the same as or different from each other, and a4, e4 and n4 each are an integer of 1 or 2, b4 and d4 each are an integer of 1 to 4 both inclusive, c4 is 0 or an integer of 1 to 4 both inclusive, and f4 and m4 each are an integer of 1 to 3 both inclusive.

Chemical Formula 13

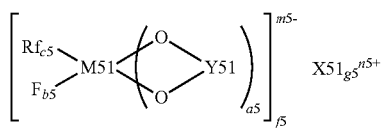

where X51 represents a Group 1A element or a Group 2A element in the short form of the periodic table of the elements, M51 represents a transition metal element, or a Group 3B element, a Group 4B element or a Group 5B element in the short form of the periodic table of the elements, Rf represents a fluorinated alkyl group having 1 to 10 carbon atoms or a fluorinated aryl group having 1 to 10 carbon atoms, Y51 represents —OC—$(CR51_2)_{d5}$-CO—, —$R52_2$C—$(CR51_2)_{d5}$-CO—, —$R52_2$C—$(CR51_2)_{d5}$-$CR52_2$-, —$R52_2$C—$(CR51_2)_{d5}$-$SO_2$—, —$O_2$S—$(CR51_2)_{e5}$-$SO_2$— or —OC—$(CR51_2)_{e5}$-$SO_2$—, in which R51 represents a hydrogen group, an alkyl group, a halogen group or a halogenated alkyl group, and may be the same as or different from each other, R52 represents a hydrogen group, an alkyl group, a halogen group or a halogenated alkyl group, and may be the same as or different from each other, but at least one of them is a halogen group or a halogenated alkyl group, and a5, f5 and n5 each are an integer of 1 or 2, b5, c5 and e5 each are an integer of 1 to 4 both inclusive, d5 is 0 or an integer of 1 to 4 both inclusive, and g5 and m5 each are an integer of 1 to 3 both inclusive.

Examples of the compound represented by Chemical Formula 11 include compounds represented by Chemical Formulas 14(1) to 14(6) and the like. Examples of the compound represented by Chemical Formula 12 include compounds represented by Chemical Formulas 15(1) to 15(8) and the like. Examples of the compound represented by Chemical Formula 13 include a compound represented by Chemical Formula 15(9) and the like. Only one kind or a mixture of a plurality of kinds selected from them may be used. Among them, as the compounds represented by Chemical Formulas 11 to 13, the compound represented by Chemical Formula 14(6) or Chemical Formula 15(2) is preferable, because a sufficient effect is obtained. As long as the compound has a composition shown in Chemical Formulas 11 to 13, the compound is not limited to the compounds represented by Chemical Formulas 14 and 15.

Chemical Formula 14

(1)

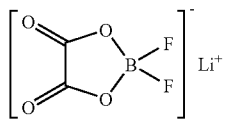

(2)

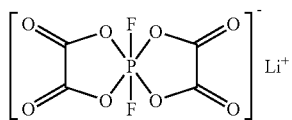

(3)

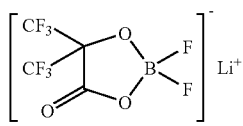

(4)

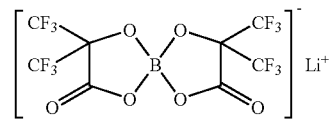

(5)

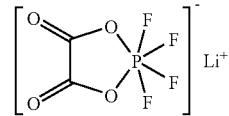

(6)

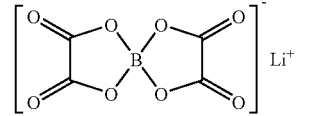

Chemical Formula 15

(1)

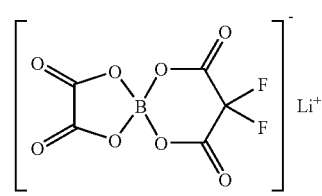

(2)

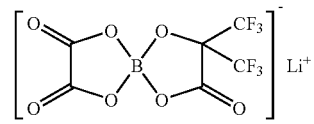

(3)

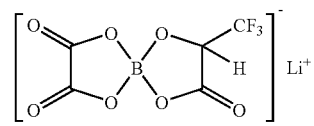

(4)

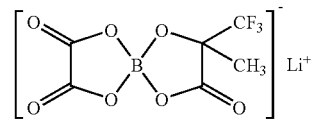

(5)

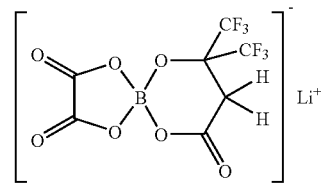

(6)

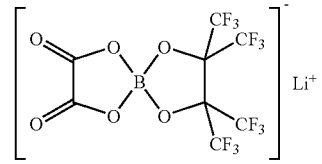

(7)

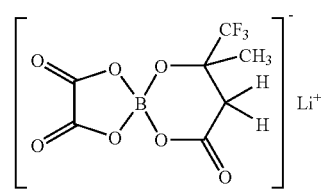

-continued

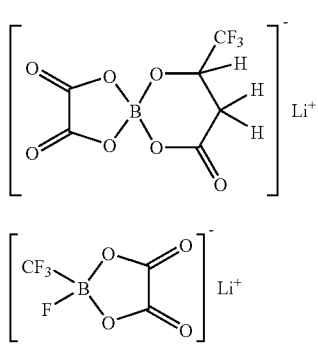

(8)

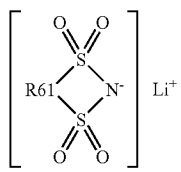

(9)

Moreover, the electrolyte salt preferably includes at least one kind selected from the group consisting of compounds represented by Chemical Formulas 16, 17 and 18, because the cycle characteristics are further improved. Only one kind or a mixture of a plurality of kinds selected from them may be used. In particular, when the electrolyte salt includes the above-described lithium hexafluorophosphate or the like and at least one kind selected from the compounds represented by Chemical Formulas 16 to 18, a higher effect is obtained.

$$LiN(C_mF_{2m+1}SO_2)(C_nF_{2n+1}SO_2) \quad \text{Chemical Formula 16}$$

where m and n each are an integer of 1 or more, and may be the same as or different from each other.

Chemical Formula 17

$$\begin{bmatrix} R61 & \begin{matrix} O & O \\ \parallel & \parallel \\ S & \\ & N^- \\ S & \\ \parallel & \parallel \\ O & O \end{matrix} \end{bmatrix} Li^+$$

where R61 represents a straight-chain or branched perfluoroalkylene group having 2 to 4 carbon atoms.

$$LiC(C_pF_{2p+1}CO_2)(C_qF_{2q+1}SO_2)(C_rF_{2r+1}SO_2) \quad \text{Chemical Formula 18}$$

where p, q and r each are an integer of 1 or more, and may be the same as or different from one another.

Examples of the chain compound represented by Chemical Formula 16 include lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)), lithium (trifluoromethanesulfonyl)(nonafluorobutanesulfonyl)imide (LiN(CF$_3$SO$_2$)(C$_4$F$_9$SO$_2$)) and the like. Only one kind or a mixture of a plurality of kinds selected from them may be used.

Examples of the cyclic compound represented by Chemical Formula 17 include compounds represented by Chemical Formula 19. More specifically, lithium 1,2-perfluoroethanedisulfonylimide in Chemical Formula 19(1), lithium 1,3-perfluoropropanedisulfonylimide in Chemical Formula 19(2), lithium 1,3-perfluorobutanedisulfonylimide in Chemical Formula 19(3), lithium 1,4-perfluorobutanedisulfonylimide in Chemical Formula 19(4), and the like are cited. Only one kind or a mixture of a plurality of kinds selected from them may be used. Among them, lithium 1,3-perfluoropropanedisulfonylimide is preferable, because a sufficient effect is obtained.

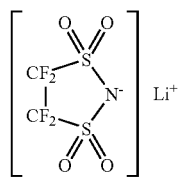

(1)

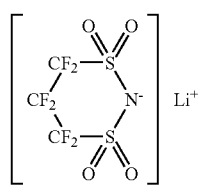

(2)

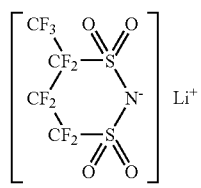

(3)

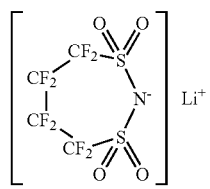

(4)

As the chain compound represented by Chemical Formula 18, for example, lithium tris(trifluoromethanesulfonyl)methide (LiC(CF$_3$SO$_2$)$_3$) or the like is cited.

The content of the electrolyte salt is preferably within a range from 0.3 mol/kg to 3.0 mol/kg both inclusive relative to the solvent. It is because when the content of the electrolyte salt is out of the range, ionic conductivity is extremely reduced, so capacity characteristics or the like may not be obtained sufficiently.

The first battery may be manufactured by the following steps, for example.

At first, the cathode active material layer 21B is formed on both sides of the cathode current collector 21A to form the cathode 21. In this case, a cathode mixture formed by mixing cathode active material powder, the electrical conductor and the binder is dispersed in a solvent to form paste-form cathode mixture slurry, and the cathode mixture slurry is applied to the cathode current collector 21A, and dried, and then the cathode mixture slurry is compression molded. Moreover, for example, by the same steps as those in the above-described method of manufacturing the anode, after the anode active material layer 22B is formed on both sides of the anode current collector 22A, the coating 22C is formed on the anode active material layer 22B, thereby the anode 22 is formed.

Next, the cathode lead 25 is attached to the cathode current collector 21A by welding, and the anode lead 26 is attached to the anode current collector 22A by welding. Then, the cathode 21 and the anode 22 are spirally wound with the separator 23 in between so as to form the spirally wound electrode body 20, and an end of the cathode lead 25 is welded to the safety valve mechanism 15, and an end of the anode lead 26 is welded to the battery can 11. Next, the spirally wound electrode body 20 is sandwiched between the pair of insulating plates 12 and 13, and they are contained in the battery can 11. Next, the electrolytic solution is injected into the battery can 11 so as to impregnate the separator 23 with the electrolytic solution. Finally, the battery cover 14, the safety valve mechanism 15 and the PTC device 16 are fixed in an open end of the battery can 11 by caulking by the gasket 17. Thereby, the secondary battery shown in FIGS. 4 and 5 is completed.

When the first battery is charged, lithium ions are extracted from the cathode 21. At this time, while the coating 22C prevents the decomposition of the electrolytic solution, extracted lithium ions efficiently pass through the coating 22C to be inserted into the anode active material layer 22B. On the other hand, when the first battery is discharged, for example, lithium ions are extracted from the anode active material layer 22B, and the lithium ions are inserted into the cathode 21 through the electrolytic solution.

In the first battery and the method of manufacturing the first battery, the anode 22 has the same configuration as that of the above-described anode shown in FIG. 1, and the anode 22 is formed by the same method as the above-described method of manufacturing the anode, so the cycle characteristics may be improved.

In particular, when the solvent includes the cyclic carbonate including an unsaturated bond, at least one kind selected from the group consisting of the chain carbonate represented by Chemical Formula 7 which includes a halogen and the cyclic carbonate represented by Chemical Formula 8 which includes a halogen, a sultone or an acid anhydride, a higher effect may be obtained.

Moreover, the electrolyte salt includes at least one kind selected from the group consisting of the compounds represented by Chemical Formulas 11 to 13 or at least one kind selected from the group consisting of the compounds represented by Chemical Formulas 16 to 18, a higher effect may be obtained.

Figure 6:
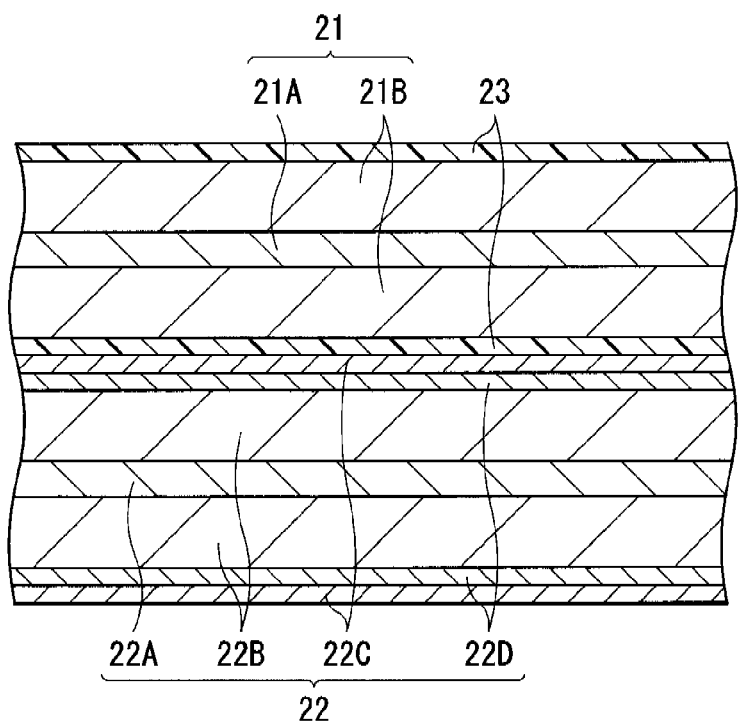
FIG. 6 is a sectional view showing a modification of the first battery.

As shown in FIG. 6 corresponding to FIG. 5, the anode 22 may have the same configuration as the anode shown in FIG. 2. The anode 22 in this case further includes an oxide coating 22D between the anode active material layer 22B and the coating 22C. The configuration of the oxide coating 22D is the same as that of the above-described oxide coating 4. In this case, compared to the case where the oxide coating 22D is not included, the chemical stability of the anode 22 is improved, so the cycle characteristics may be further improved.

Moreover, the anode 22 may have the same configuration as that of the anode as the second modification shown in FIG. 3. In this case, electrical conductivity between the anode current collector 1 and the anode active material layer 2 is improved, the cycle characteristics may be further improved.

A method of using the metal salt represented by Chemical Formula 3 or a metal salt of oxocarbonic acid as a binder in the anode is considered; however, in this case, in addition to a demand for an improvement in chemical stability, various constraint conditions including various properties such as adhesion, elasticity, extensity, workability or solubility, or physical properties in the form of slurry are imposed. On the other hand, in the embodiment, the coating 22C is arranged separately from the anode active material layer 22B, so a specific material for an improvement in chemical stability may be selected.

Second Battery

Figure 7:
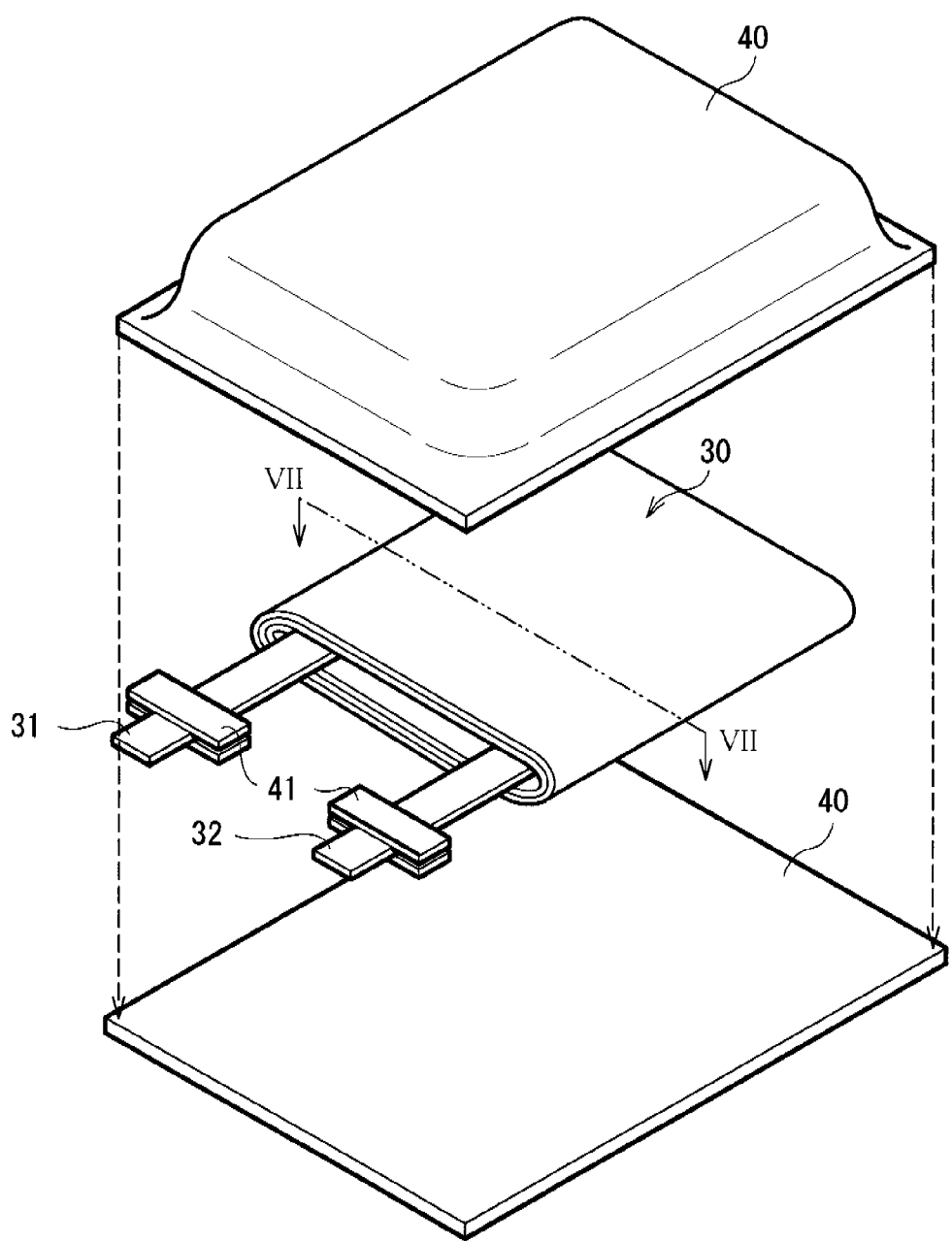
FIG. 7 is an exploded perspective view showing the configuration of a second battery using the anode according to the embodiment of the invention.

FIG. 7 shows an exploded perspective view of a second battery. In the second battery, a spirally wound electrode body 30 to which a cathode lead 31 and an anode lead 32 are attached is contained in film-shaped package members 40, and the configuration of the battery is a so-called laminate film type.

The cathode lead 31 and the anode lead 32 are drawn, for example, from the interiors of the package members 40 to outside in the same direction. The cathode lead 31 is made of, for example, a metal material such as aluminum, and the anode lead 32 are made of, for example, a metal material such as copper, nickel or stainless. The metal materials of which the cathode lead 31 and the anode lead 32 are made each have a sheet shape or a mesh shape.

The package members 40 are made of, for example, a rectangular aluminum laminate film including a nylon film, aluminum foil and a polyethylene film which are bonded in this order. The package members 40 are arranged so that the polyethylene film of each of the package members 40 faces the spirally wound electrode body 30, and edge portions of the package members 40 are adhered to each other by fusion bonding or an adhesive. An adhesive film 41 is inserted between the package members 40 and the cathode lead 31 and the anode lead 32 for preventing the entry of outside air. The adhesive film 41 is made of, for example, a material having adhesion to the cathode lead 31 and the anode lead 32, for example, a polyolefin resin such as polyethylene, polypropylene, modified polyethylene or modified polypropylene.

In addition, the package members 40 may be made of a laminate film with any other configuration, a polymer film such as polypropylene or a metal film instead of the above-described three-layer aluminum laminate film.

Figure 8:
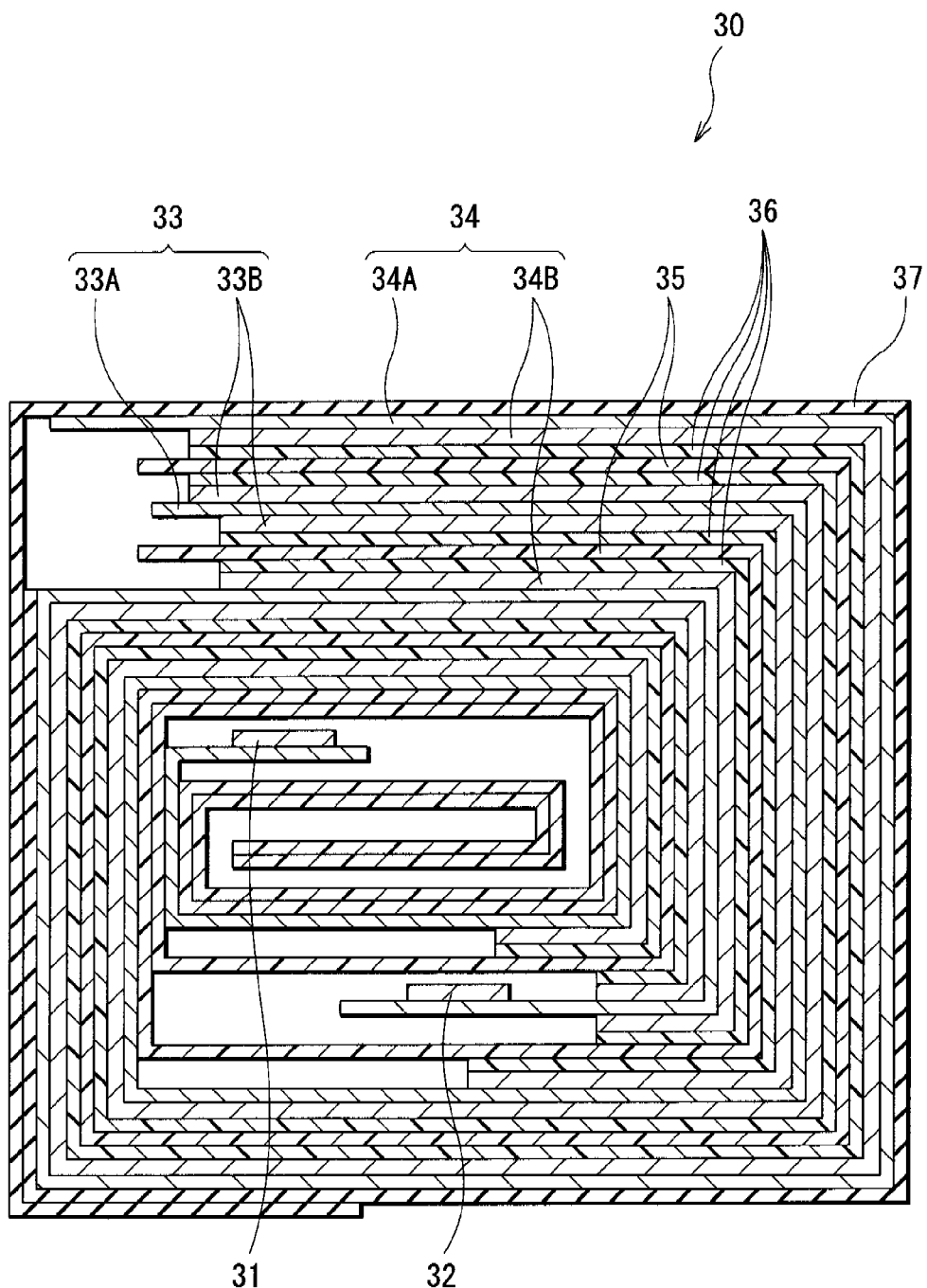
FIG. 8 is a sectional view showing a spirally wound electrode body taken along a line VII-VII of FIG. 7.

FIG. 8 shows a sectional view of the spirally wound electrode body 30 taken along a line VII-VII of FIG. 7. The spirally wound electrode body 30 is formed by laminating a cathode 33 and an anode 34 with a separator 35 and an electrolyte 36 in between, and then spirally winding them, and an outermost portion of the spirally wound electrode body 30 is protected with a protective tape 37.

Figure 9:
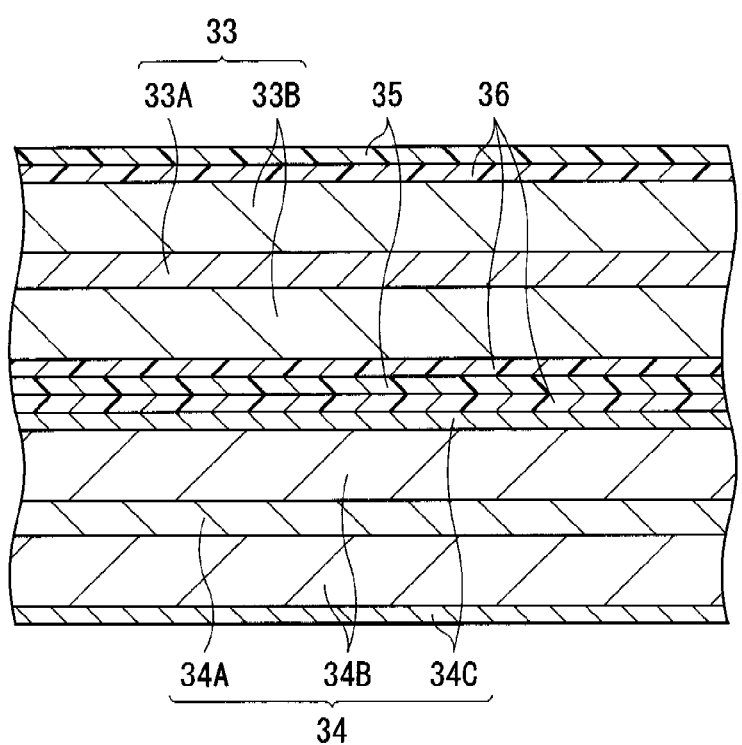
FIG. 9 is an enlarged sectional view of a part of a spirally wound electrode body shown in FIG. 8.

FIG. 9 shows an enlarged view of a part of the spirally wound electrode body 30 shown in FIG. 8. The cathode 33 is formed by arranging a cathode active material layer 33B on both sides of a cathode current collector 33A. The anode 34 has, for example, the same configuration as that of the anode shown in FIG. 1, and is formed by arranging an anode active material layer 34B and a coating 34C on both sides of an anode current collector 34A. The configurations of the cathode current collector 33A, the cathode active material layer 33B, the anode current collector 34A, the anode active material layer 34B, the coating 34C and the separator 35 are the same as those of the cathode current collector 21A, the cathode active material layer 21B, the anode current collector 22A, the anode active material layer 22B, the coating 22C and the separator 23 in the above-described first battery, respectively.

The electrolyte 36 includes the electrolytic solution and a polymer compound holding the electrolytic solution, and is a so-called gel electrolyte. The gel electrolyte is preferable, because the gel electrolyte is capable of obtaining high ionic conductivity (for example, 1 mS/cm or over at room temperature), and liquid leakage from the battery is prevented.

As the polymer compound, for example, an ether-based polymer compound such as polyethylene oxide or a cross-link including polyethylene oxide, an ester-based polymer compound such as polymethacrylate or an acrylate-based polymer compound, or a polymer of vinylidene fluoride such as polyvinylidene fluoride or a copolymer of vinylidene fluoride and hexafluoropropylene is cited. Only one kind or a mixture of a plurality of kinds selected from them may be used. More specifically, in terms of stability of oxidation-reduction, the fluororine-based polymer compound such as a copolymer of vinylidene fluoride is preferably used. The additive amount of the polymer compound in the electrolytic solution is dependent on compatibility between them; however, for example, the additive amount is preferably within a range from 5 wt % to 50 wt % both inclusive.

The composition of the electrolytic solution is the same as that of the electrolytic solution in the first battery. However, the solvent in this case means a wide concept including not only a liquid solvent but also a solvent having ionic conductivity capable of dissociating the electrolyte salt. Therefore, in the case where a polymer compound having ionic conductivity is used, the polymer compound is included in the concept of the solvent.

In addition, instead of the gel electrolyte 36 in which the polymer compound holds the electrolytic solution, the electrolytic solution may be used as it is. In this case, the separator 35 is impregnated with the electrolytic solution.

The second secondary battery may be manufactured by the following three kinds of manufacturing methods, for example.

In a first manufacturing method, at first, by the same steps as those in the method of manufacturing the first battery, the cathode active material layer 33B is formed on both sides of the cathode current collector 33A so as to form the cathode 33. Moreover, for example, by the same steps as those in the above-described method of manufacturing the anode, the anode active material layer 34B and the coating 34C are formed on both sides of the anode current collector 34A so as to form the anode 34.

Next, the gel electrolyte 36 is formed by preparing a precursor solution including the electrolytic solution, the polymer compound and a solvent, applying the precursor solution to the cathode 33 and the anode 34, and volatilizing the solvent. Next, the cathode lead 31 and the anode lead 32 are attached to the cathode current collector 33A and the anode current collector 34A, respectively. Next, after the cathode 33 on which the electrolyte 36 is formed and the anode 34 on which the electrolyte 36 is formed are laminated with the separator 35 in between to form a laminate, the laminate is spirally wound in a longitudinal direction, and the protective tape 37 is bonded to an outermost portion of the laminate so as to form the spirally wound electrode body 30. Then, for example, the spirally wound electrode body 30 is sandwiched between two film-shaped package members 40, and edge portions of the package members 40 are adhered to each other by thermal fusion bonding or the like to seal the spirally wound electrode body 30 in the package members 40. At this time, the adhesive film 41 is inserted between the cathode lead 31 and the anode lead 32, and the package members 40. Thereby, the secondary battery shown in FIGS. 7 to 9 is completed.

In a second manufacturing method, at first, after the cathode lead 31 and the anode lead 32 are attached to the cathode 33 and the anode 34, respectively, the cathode 33 and the anode 34 are laminated with the separator 35 in between to form a laminate, and the laminate is spirally wound, and the protective tape 37 is bonded to an outermost portion of the spirally wound laminate so as to form a spirally wound body as a precursor body of the spirally wound electrode body 30. Next, the spirally wound body is sandwiched between two film-shaped package members 40, and the edge portions of the package members 40 except for edge portions on one side are adhered by thermal fusion bonding or the like to form a pouched package, thereby the spirally wound body is contained in the package members 40. An electrolytic composition which includes the electrolytic solution, monomers as materials of a polymer compound and a polymerization initiator and, if necessary, any other material such as a polymerization inhibitor is prepared, and the composition is injected in the package members 40, and then an opened portion of the package members 40 are sealed by thermal fusion bonding or the like. Finally, the monomers are polymerized by applying heat to form the polymer compound, thereby the gel electrolyte 36 is formed. Thus, the secondary battery is completed.

In a third manufacturing method, as in the case of the first manufacturing method, the spirally wound body is formed, and the spirally wound body is contained in the package members 40, except that the separator 35 with both sides coated with a polymer compound is used. As the polymer compound applied to the separator 35, for example, a polymer including vinylidene fluoride as a component, that is, a homopolymer, a copolymer, a multicomponent copolymer, or the like is cited. More specifically, polyvinylidene fluoride, a binary copolymer including vinylidene fluoride and hexafluoropropylene as components, a ternary copolymer including vinylidene fluoride, hexafluoropropylene and chlorotrifluoroethylene as components is cited. The polymer compound may include one kind or two or more kinds of other polymer compounds in addition to the above-described polymer including vinylidene fluoride as a component. Next, after the electrolytic solution is prepared, and injected into the package members 40, an opened portion of the package members 40 is sealed by thermal fusion bonding or the like. Finally, the package members 40 are heated while being weighted so that the separator 35 is brought into close contact with the cathode 33 and the anode 34 with the polymer compound in between. Thereby, the polymer compound is impregnated with the electrolytic solution, and the polymer compound is gelatinized so as to form the electrolyte 36, so the secondary battery is completed. In the third manufacturing method, compared to the first manufacturing method, swelling characteristics are improved. Moreover, in the third manufacturing method, compared to the second manufacturing method, monomers as the materials of the polymer compound, the solvent and the like hardly remain in the electrolyte 36, and a step of forming the polymer compound is controlled well, so sufficient adhesion between the cathode 33, anode 34, the separator 35 and the electrolyte 36 is obtained.

As in the case of the first battery, in the second secondary battery, lithium ions are inserted and extracted between the cathode 33 and the anode 34. In other words, when the secondary battery is charged, for example, lithium ions are extracted from the cathode 33, and are inserted into the anode 34 through the electrolyte 36. On the other hand, when the secondary battery is discharged, lithium ions are extracted from the anode 34, and are inserted into the cathode 33 through the electrolyte 36.

The functions and effects of the second battery and the method of manufacturing the second battery are the same as those in the first battery.

Figure 10:
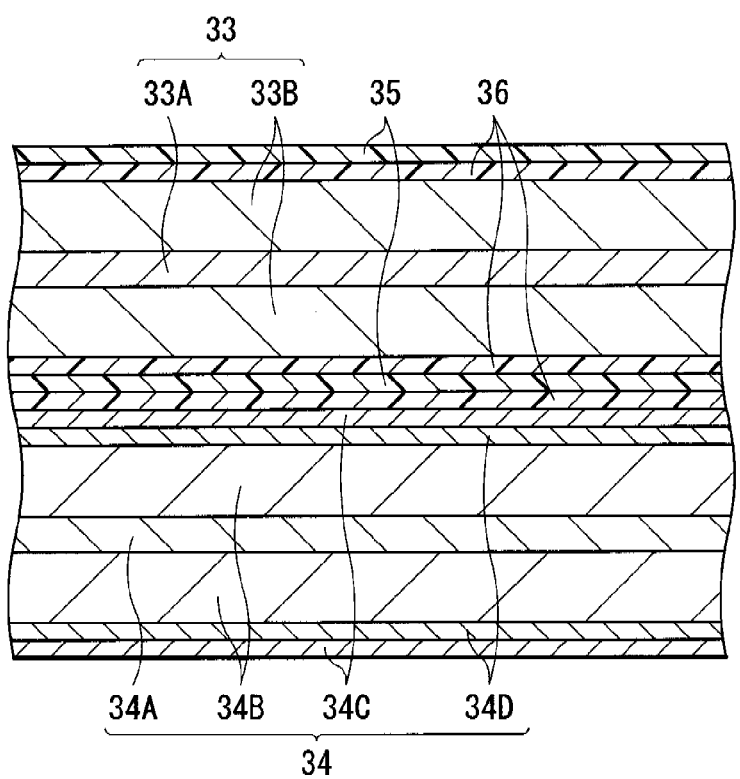
FIG. 10 is a sectional view showing a modification of the second battery.

As shown in FIG. 10 corresponding to FIG. 9, the anode 34 may have the same configuration as that of the anode shown in FIG. 2. The anode 34 in this case further includes an oxide coating 34D between the anode active material layer 34B and the coating 34C. The configuration of the oxide coating 34D is the same as that of the above-described oxide coating 4. Even in this case, the cycle characteristics may be further improved.

Moreover, the anode 34 may have the same configuration as that of the anode as the second modification shown in FIG. 3. In this case, electrical conductivity between the anode current collector 34A and the anode active material layer 34B is improved, so the cycle characteristics may be further improved.

Third Battery

Figure 11:
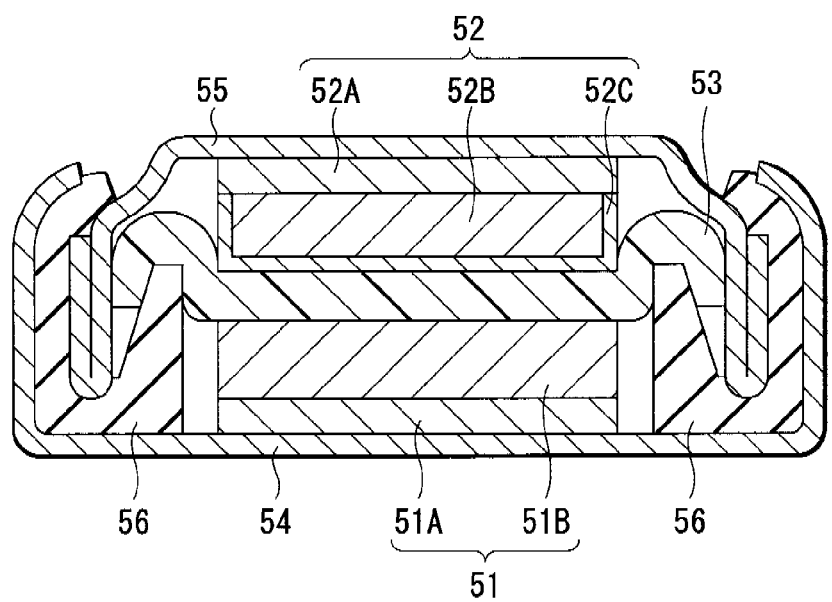
FIG. 11 is a sectional view showing the configuration of a third battery using the anode according to the embodiment of the invention.

FIG. 11 shows an exploded perspective view of a third battery. In the third battery, a cathode 51 is attached to a package can 54, and an anode 52 is contained in a package cup 55, and after the cathode 51 and the anode 52 are laminated with a separator 53 impregnated with an electrolytic solution in between, they are caulked by a gasket 56. The battery configuration using the package can 54 and the package cup 55 is a so-called coin type.

The cathode 51 is formed by arranging a cathode active material layer 51B on one side of a cathode current collector 61A. The anode 52 is formed by arranging an anode active material layer 52B and a coating 52C on one side of a cathode current collector 52A. The configurations of the cathode current collector 61A, the cathode active material layer 51B, the anode current collector 52A, the anode active material layer 52B, the coating 52C and the separator 53 are the same as those of the cathode current collector 21A, the cathode active material layer 21B, the anode current collector 22A, the anode active material layer 22B, the coating 22C and the separator 23 in first battery, respectively.

In the third battery, as in the case of the first battery, lithium ions are inserted and extracted between the cathode 51 and the anode 52. In other words, when the third battery is charged, for example, lithium ions are extracted from the cathode 51, and are inserted into the anode 52 through the electrolytic solution. On the other hand, when the third battery is discharged, lithium ions are extracted from the anode 52, and are inserted into the cathode 51 through the electrolytic solution.

The functions and effects of the third secondary battery and the method of manufacturing the third secondary battery are the same as those in the first battery.

Figure 12:
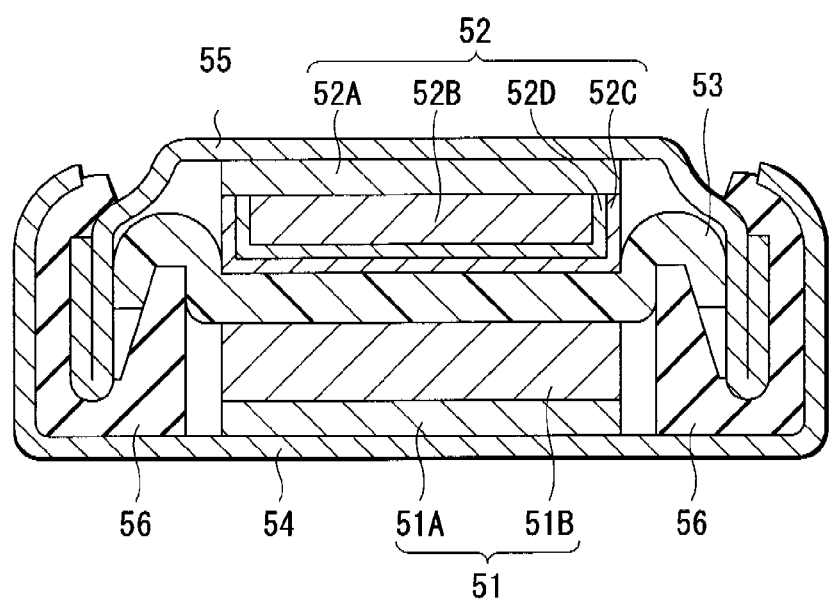
FIG. 12 is a sectional view showing a modification of the third battery.
Figure 13:
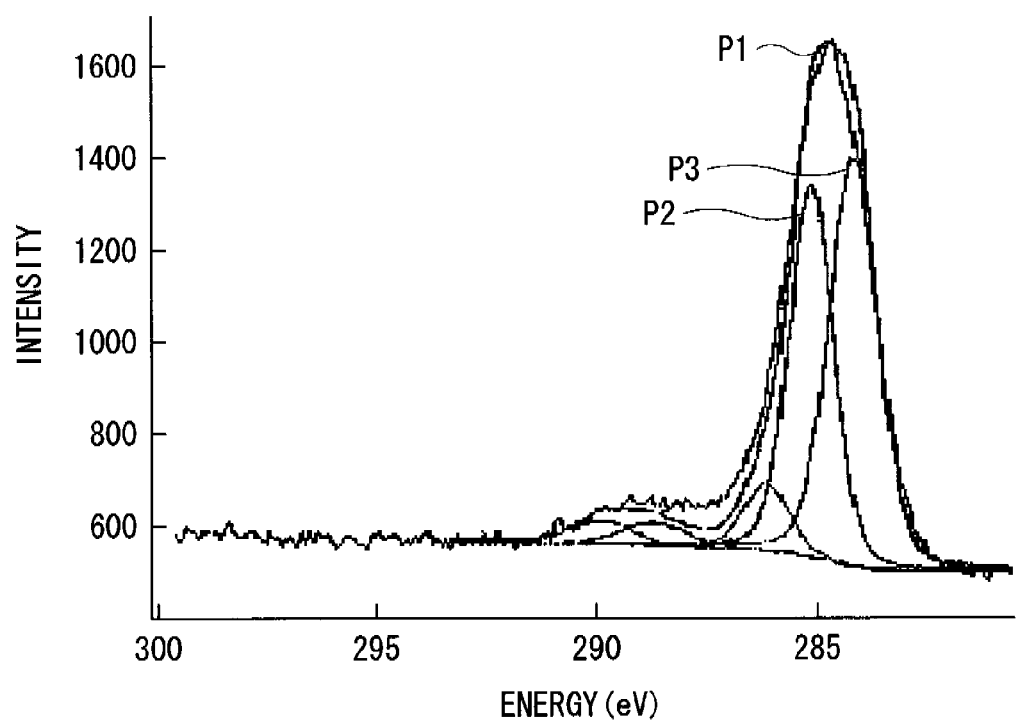
FIG. 13 is an illustration showing the result of an analysis on a SnCoC-containing material by X-ray photoelectron spectroscopy.

As shown in FIG. 12 corresponding to FIG. 11, the anode 52 may have the same configuration as the anode shown in FIG. 2. The anode 52 in this case further includes an oxide coating 52D between the anode active material layer 52B and the coating 52C. The configuration of the oxide coating 52D is the same as that of the above-described oxide coating 4. Even in this case, the cycle characteristics may be further improved.

Moreover, the anode 52 may have the same configuration as that of the anode as the second modification shown in FIG. 3. In this case, electrical conductivity between the anode current collector 52A and the anode active material layer 52B is improved, so the cycle characteristics may be further improved.

EXAMPLES

Specific examples of the invention will be described in detail below.

Examples 1-1 to 1-9

Laminate film type secondary batteries shown in FIGS. 7 and 8 were formed through the use of silicon as an anode active material.

At first, the cathode 33 was formed. In this case, after lithium carbonate ($Li_2CO_3$) and cobalt carbonate ($CoCO_3$) were mixed at a molar ratio of 0.5:1, the mixture was fired in air at 900° C. for 5 hours to obtain a lithium-cobalt complex oxide ($LiCoO_2$). Next, after 91 parts by weight of the lithium-cobalt complex oxide as a cathode active material, 6 parts by weight of graphite as an electrical conductor and 3 parts by weight of polyvinylidene fluoride as a binder were mixed to form a cathode mixture, the cathode mixture was dispersed in N-methyl-2-pyrrolidone to form paste-form cathode mixture slurry. Next, after the cathode mixture slurry was applied to the cathode current collector 33A made of aluminum foil (with a thickness of 12 µm), and was dried, the cathode mixture slurry was compression molded by a roller press to form the cathode active material layer 33B. After that, the cathode lead 31 made of aluminum was attached to an end of the cathode current collector 33A by welding.

Next, the anode 34 was formed. In this case, after silicon was evaporated on both sides of the anode current collector 34A made of copper foil (with a thickness of 10 µm) by an electron beam evaporation method to form the anode active material layer 34B, the coating 34C was formed so that the anode active material layer 34B was covered with the coating 34C. The coating 34C was formed by the following steps. A 3-wt % solution as a solution including each of various metal salts (lithium salts) shown in Table 1 was prepared, and the anode current collector 34A on which the anode active material layer 34B was formed was immersed in the solution for a few seconds, and the anode current collector 34A was taken out of the solution, and was dried under reduced pressure at 60° C., thereby the coating 34C was obtained. After that, the anode lead 32 made of nickel was attached to an end of the anode current collector 34A by welding.

When the coating 34C in Example 1-1 was analyzed by ToF-SIMS, a peak having a molecular weight corresponding to $C_2H_4S_2O_6Li_3^+$ as a positive secondary ion was observed, and a peak having a molecular weight corresponding to $C_2H_4S_2O_6Li^-$ as a negative secondary ion was observed. Thereby, it was confirmed that the coating 34C was formed of dilithium ethanedisulfonate. In the same manner, it was confirmed that in Examples 1-2 to 1-9, the coating 34C was formed of each of various metal salts shown in Table 1. More specifically, for example, in Example 1-4, $C_3H_4SO_5Li_3^+$ as a positive secondary ion and $C_3H_4SO_5Li^-$ as a negative secondary ion were observed, so it was confirmed that the coating 34C was made of dilithium sulfopropionate. In Example 1-6, $C_7H_4SO_5Li_3^+$ as a positive secondary ion and $C_7H_4SO_5Li^-$ as a negative secondary ion were observed, so it was confirmed that the coating 34C was made of dilithium sulfobenzoate. In Example 1-7, $C_4H_4O_4Li_3^+$ as a positive secondary ion and $C_4H_4O_4Li^-$ as a negative secondary ion were observed, so it was confirmed that the coating 34C was made of dilithium succinate. In Example 1-9, $C_4O_4Li_3^+$ as a positive secondary ion and $C_4O_4Li^-$ as a negative secondary ion were observed, so it was confirmed that the coating 34C was made of dilithium squarate. It was confirmed by analysis using ToF-SIMS that in Examples 1-2, 1-3, 1-5 and 1-8, the coating 34C was made of dilithium propanedisulfonate, dilithium sulfoacetate, dilithium sulfobutanoate, and trilithium sulfosuccinate, respectively.

Next, the cathode 33, the separator 35 made of a microporous polypropylene film (with a thickness of 25 µm), and the anode 34 were laminated in this order to form a laminate, and then the laminate was spirally wound several times in a longitudinal direction, and an outermost portion of the laminate was fixed by the protective tape 37 made of an adhesive tape to form a spirally wound body as a precursor body of the spirally wound electrode body 30. Next, after the spirally wound body was sandwiched between package members 40 made of a laminate film (with a total thickness of 100 µm) with a three-layer configuration formed by laminating nylon with a thickness of 30 µm, aluminum foil with a thickness of 40 µm and cast polypropylene with a thickness of 30 µm in order from outside, the edge portions of the package members 40 except for edge portions on one side were adhered by thermal fusion bonding to form a pouched package, thereby the spirally wound body was contained in the package members 40. Next, the electrolytic solution was injected into the package members 40 from an opened portion of the package members 40, and the separator 35 was impregnated with the electrolytic solution as the electrolyte 36, thereby the spirally wound electrode body 30 was formed.

As the electrolytic solution, a mixture solvent formed by mixing ethylene carbonate (EC) and diethyl carbonate (DEC) was used as the solvent, and lithium hexafluorophosphate (LiPF$_6$) was used as the electrolyte salt. At that time, the composition of the mixture solvent had a weight ratio of EC:DEC=30:70, and the concentration of lithium hexafluorophosphate in the electrolytic solution was 1 mol/kg.

Finally, the opened portion of the package members 40 were sealed by thermal fusion bonding in a vacuum atmosphere, thereby laminate film type secondary batteries were completed.

Examples 1-10 to 1-25

Secondary batteries of Examples 1-10 to 1-25 were formed as in the case of Examples 1-1 to 1-9, except that the coating 34C was made of a magnesium salt or a calcium salt shown in Table 2 (which will be shown later).

Comparative Example 1-1

A secondary battery was formed as in the case of Examples 1-1 to 1-9, except that the coating 34C was not formed.

Comparative Example 1-2

A secondary battery was formed as in the case of Examples 1-1 to 1-9, except that the coating 34C made of lithium acetate was formed.

When a cycle test was performed on each of the secondary batteries of Examples 1-1 to 1-25 and Comparative Examples 1-1 and 1-2 to determine the discharge capacity retention ratio and the initial discharge capacity, results shown in Tables 1 and 2 were obtained.

In the cycle test, each secondary battery was repeatedly charged and discharged by the following steps to determine the discharge capacity retention ration. At first, two cycles of charge and discharge were performed on the secondary battery in an atmosphere at 23° C. to determine the discharge capacity in the second cycle. Next, charge and discharge were performed until the total cycle number reached 100 cycles in the same atmosphere to determine the discharge capacity in the 100th cycle. Finally, the discharge capacity retention ratio (%)=(discharge capacity in the 100th cycle/discharge capacity in the second cycle)×100 was determined by calculation. As the conditions of one cycle of charge and discharge, after the secondary battery was charged at a constant current density of 1 mA/cm$^2$ until the battery voltage reached 4.2 V, and then the secondary battery was charged at a constant voltage of 4.2 V until the current density reached 0.02 mA/cm$^2$, the secondary battery was discharged at a constant current density of 1 mA/cm$^2$ until the battery voltage reached 2.5 V. Moreover, the discharge capacity in the first cycle was considered as the initial discharge capacity.

In addition, the steps and the conditions of the above-described cycle test were used in the following examples and the following comparative examples in the same manner.

TABLE 1

Battery shape: laminate film type
Anode active material: silicon (electron beam evaporation)
Electrolyte salt: LiPF$_6$ (1 mol/kg)

| | ANODE COATING | SOLVENT OF ELECTROLYTIC SOLUTION (WT %) | | DISCHARGE CAPACITY RETENTION RATIO (%) | INITIAL DISCHARGE CAPACITY (mAh) |
|---|---|---|---|---|---|
| | | EC | DEC | | |
| EXAMPLE 1-1 | dilithium ethanedisulfonate | 30 | 70 | 34 | 802 |
| EXAMPLE 1-2 | dilithium propanedisulfonate | | | 36 | 805 |
| EXAMPLE 1-3 | dilithium sulfoacetate | | | 57 | 800 |
| EXAMPLE 1-4 | dilithium sulfopropionate | | | 58 | 799 |
| EXAMPLE 1-5 | dilithium sulfobutanoate | | | 55 | 796 |
| EXAMPLE 1-6 | dilithium sulfobenzoate | | | 44 | 798 |
| EXAMPLE 1-7 | dilithium succinate | | | 40 | 800 |
| EXAMPLE 1-8 | trilithium sulfosuccinate | | | 56 | 792 |
| EXAMPLE 1-9 | dilithium squarate | | | 34 | 801 |
| COMPARATIVE EXAMPLE 1-1 | — | 30 | 70 | 30 | 798 |
| COMPARATIVE EXAMPLE 1-2 | lithium acetate | | | 30 | 795 |

TABLE 2

Battery shape: laminate film type
Anode active material: silicon (electron beam evaporation)
Electrolyte salt: LiPF$_6$ (1 mol/kg)

| | ANODE COATING | SOLVENT OF ELECTROLYTIC SOLUTION (WT %) | | DISCHARGE CAPACITY RETENTION RATIO (%) | INITIAL DISCHARGE CAPACITY (mAh) |
|---|---|---|---|---|---|
| | | EC | DEC | | |
| EXAMPLE 1-10 | magnesium ethanedisulfonate | 30 | 70 | 32 | 795 |
| EXAMPLE 1-11 | magnesium propanedisulfonate | | | 33 | 794 |
| EXAMPLE 1-12 | magnesium sulfoacetate | | | 61 | 800 |
| EXAMPLE 1-13 | magnesium sulfopropionate | | | 61 | 790 |
| EXAMPLE 1-14 | magnesium sulfobutanoate | | | 57 | 798 |
| EXAMPLE 1-15 | magnesium sulfobenzoate | | | 46 | 795 |
| EXAMPLE 1-16 | magnesium succinate | | | 42 | 788 |
| EXAMPLE 1-17 | trimagnesium disulfosuccinate | | | 57 | 790 |
| EXAMPLE 1-18 | calcium ethanedisulfonate | | | 33 | 793 |
| EXAMPLE 1-19 | calcium propanedisulfonate | | | 33 | 793 |
| EXAMPLE 1-20 | calcium sulfoacetate | | | 59 | 802 |
| EXAMPLE 1-21 | calcium sulfopropionate | | | 60 | 795 |
| EXAMPLE 1-22 | calcium sulfobutanoate | | | 56 | 796 |
| EXAMPLE 1-23 | calcium sulfobenzoate | | | 46 | 798 |
| EXAMPLE 1-24 | calcium succinate | | | 43 | 785 |
| EXAMPLE 1-25 | tricalcium disulfosuccinate | | | 57 | 790 |
| COMPARATIVE EXAMPLE 1-1 | — | 30 | 70 | 30 | 798 |
| COMPARATIVE EXAMPLE 1-2 | lithium acetate | | | 30 | 795 |

As shown in Tables 1 and 2, in Examples 1-1 to 1-25 in which the coating 34C was formed, the discharge capacity retention ratio was higher than that in Comparative Example 1-1 in which the coating 34C was not formed. The initial discharge capacity in Examples 1-1 to 1-25 was substantially the same as that in Comparative Example 1-1. Moreover, in Examples 1-1 to 1-25, the coating 34C included two or more acids of at least one kind selected from the group consisting of a carboxylic acid and a sulfonic acid, so compared to Comparative Example 1-2 in which a sulfonic acid was not included, and only one carboxylic acid was included, a higher discharge capacity retention ratio was obtained. The initial discharge capacity in Examples 1-1 to 1-25 was substantially the same as that in Comparative Example 1-2.

Example 2-1

A secondary battery was formed as in the case of Example 1-4, except that as a solvent, propylene carbonate (PC) was added, and the composition of the mixture solvent was changed. At that time, the composition of the mixture solvent had a weight ratio of EC:PC:DEC=10:20:70.

Example 2-2

A secondary battery was formed as in the case of Example 1-4, except that as a solvent, 4-fluoro-1,3-dioxolane-2-one (FEC) was used instead of EC. At that time, the composition of the mixture solvent had a weight ratio of DEC:FEC=70:30.

Example 2-3

A secondary battery was formed as in the case of Example 1-3, except that as solvents, PC and FEC were added, and the composition of the mixture solvent was changed. At that time, the composition of the mixture solvent had a weight ratio of EC:PC:DEC:FEC=10:10:70:10.

Example 2-4

A secondary battery was formed as in the case of Example 2-3, except that the coating 3 was made of magnesium sulfopropionate.

Example 2-5

A secondary battery was formed as in the case of Example 1-4, except that as a solvent, 4,5-difluoro-1,3-dioxolane-2-one (DFEC) was added, and the composition of the mixture solvent was changed. At that time, the composition of the mixture solvent had a weight ratio of EC:DEC:DFEC=10:70:20.

Example 2-6

A secondary battery was formed as in the case of Example 1-4, except that as solvents, PC and DFEC were added, and the composition of the mixture solvent was changed. At that time, the composition of the mixture solvent had a weight ratio of EC:PC:DEC:DFEC=10:10:70:10.

Examples 2-7, 2-8

Secondary batteries were formed as in the case of Example 1-4, except that as solvents, PC and vinylene carbonate (VC) were added, and the composition of the mixture solvent was changed. At that time, the composition of the mixture solvent had a weight ratio of EC:PC:DEC:VC=10:19:70:1 (Example 2-7) or EC:PC:DEC:VC=10:10:70:10 (Example 2-8).

Example 2-9

A secondary battery was formed as in the case of Example 2-2, except that as a solvent, bis(fluoromethyl)carbonate (DFDMC) was added, and the composition of the mixture solvent was changed. At that time, the composition of the mixture solvent had a weight ratio of DEC:FEC:DFDMC=65:30:5.

Comparative Example 2-1

A secondary battery was formed as in the case of Example 2-2, except that the coating 3 was not formed.

Comparative Example 2-2

A secondary battery was formed as in the case of Example 2-5, except that the coating 3 was not formed.

When a cycle test was performed on each of the secondary batteries of Examples 2-1 to 2-9 and Comparative Examples 2-1 and 2-2 to determine the discharge capacity retention ratio and the initial discharge capacity, results shown in Table 3 were obtained. In Table 3, data of Example 1-4 is also shown.

DFEC or DFDMC was added, a much higher discharge capacity retention ratio was obtained. Therefore, it was confirmed that the electrolytic solution which included cyclic carbonate including a halogen or a chain carbonate including a halogen as a solvent was specifically advantageous to improve cycle characteristics.

Moreover, it was confirmed from a comparison between Examples 2-2 and Comparative Example 2-1 and a comparison between Example 2-5 and Comparative Example 2-2 that in the case where the solvent of the electrolytic solution had the same composition, when the coating 3 was formed, a higher discharge capacity retention ratio was obtained. The initial discharge capacities of them were substantially the same as each other.

Examples 3-1 to 3-3

Secondary batteries were formed as in the case of Example 2-2, except that as a solvent, propene sultone (PRS: Example 3-1) as a sultone, succinic anhydride (SCAH: Example 3-2) as an acid anhydride or sulfobenzoic anhydride (SBAH: Example 3-3) as an acid anhydride was added. At that time, the concentration of PRS, SCAH or SBAH in the electrolytic solution was 1 wt %.

TABLE 3

Battery shape: laminate film type
Anode active material: silicon (electron beam evaporation)
Electrolyte salt: LiPF$_6$ (1 mol/kg)

| | ANODE COATING | SOLVENT OF ELECTROLYTIC SOLUTION (WT %) | | | | | | | DISCHARGE CAPACITY RETENTION RATIO (%) | INITIAL DISCHARGE CAPACITY (mAh) |
|---|---|---|---|---|---|---|---|---|---|---|
| | | EC | PC | DEC | FEC | DFEC | VC | DFDMC | | |
| EXAMPLE 1-4 | dilithium sulfopropionate | 30 | — | 70 | — | — | — | — | 58 | 799 |
| EXAMPLE 2-1 | dilithium sulfopropionate | 10 | 20 | 70 | — | — | — | — | 60 | 801 |
| EXAMPLE 2-2 | dilithium sulfopropionate | — | — | 70 | 30 | — | — | — | 82 | 802 |
| EXAMPLE 2-3 | dilithium sulfopropionate | 10 | 10 | 70 | 10 | — | — | — | 75 | 799 |
| EXAMPLE 2-4 | magnesium sulfopropionate | 10 | 10 | 70 | 10 | — | — | — | 77 | 791 |
| EXAMPLE 2-5 | dilithium sulfopropionate | 10 | — | 70 | — | 20 | — | — | 83 | 796 |
| EXAMPLE 2-6 | dilithium sulfopropionate | 10 | 10 | 70 | — | 10 | — | — | 82 | 797 |
| EXAMPLE 2-7 | dilithium sulfopropionate | 10 | 19 | 70 | — | — | 1 | — | 60 | 797 |
| EXAMPLE 2-8 | dilithium sulfopropionate | 10 | 10 | 70 | — | — | 10 | — | 65 | 798 |
| EXAMPLE 2-9 | dilithium sulfopropionate | — | — | 65 | 30 | — | — | 5 | 83 | 797 |
| COMPARATIVE EXAMPLE 2-1 | — | — | — | 70 | 30 | — | — | — | 68 | 800 |
| COMPARATIVE EXAMPLE 2-2 | — | 10 | — | 70 | — | 20 | — | — | 69 | 790 |

As shown in Table 3, there was a tendency that in Examples 2-1 to 2-9 in which PC, FEC, DFEC, VC or DFDMC was added, the discharge capacity retention ratio was higher than that in Example 1-4 in which they were not added. In particular, in Examples 2-2, 2-3, 2-5, 2-6 and 2-9 in which FEC, When a cycle test was performed on each of the secondary batteries of Examples 3-1 to 3-3 to determine the discharge capacity retention ratio and the initial discharge capacity, results shown in Table 4 were obtained. In Table 4, data of Example 2-2 is also shown.

TABLE 4

Battery shape: laminate film type
Anode active material: silicon (electron beam evaporation)
Electrolyte salt: LiPF$_6$ (1 mol/kg)

| | ANODE COATING | SOLVENT OF ELECTROLYTIC SOLUTION (WT %) | | | DISCHARGE CAPACITY RETENTION RATIO (%) | INITIAL DISCHARGE CAPACITY (mAh) |
|---|---|---|---|---|---|---|
| | | DEC | FEC | OTHERS | | |
| EXAMPLE 2-2 | dilithium sulfopropionate | 70 | 30 | — | 82 | 802 |
| EXAMPLE 3-1 | | | | PRS (1 wt %) | 82 | 795 |
| EXAMPLE 3-2 | | | | SCAH (1 wt %) | 83 | 796 |
| EXAMPLE 3-3 | | | | SBAH (1 wt %) | 85 | 794 |

As shown in Table 4, in Examples 3-1 to 3-3 in which PRS, SCAH or SBAH was added as a solvent, the discharge capacity retention ratio was higher than that in Example 2-2 in which they were not added. Therefore, it was confirmed that when the electrolytic solution included a sultone or an acid anhydride as a solvent, cycle characteristics were further improved.

Examples 4-1, 4-2

Secondary batteries were formed as in the case of Example 1-4, except that as the electrolyte salt, the compound represented by Chemical Formula 14(6) (Example 4-1) or the compound represented by Chemical Formula 15(2) (Example 4-2) was added. At that time, the concentration of lithium hexafluorophosphate in the electrolytic solution was 0.9 mol/kg, and the concentration of the added compound was 0.1 mol/kg.

Example 4-3, 4-4

Secondary batteries were formed as in the case of Example 2-2, except that as the electrolyte salt, lithium tetrafluoroborate (LiBF$_4$: Example 4-3) or the compound represented by Chemical Formula 19(2) (Example 4-4) was added. At that time, the concentration of lithium hexafluorophosphate in the electrolytic solution was 0.9 mol/kg, and the concentration of added lithium tetrafluoroborate or the added compound represented by Chemical Formula 19(2) was 0.1 mol/kg.

When a cycle test was performed on each of the secondary batteries of Example 4-1 to 4-4 to determine the discharge capacity retention ratio and the initial discharge capacity, results shown in Table 5 were obtained. In Table 5, data of Example 1-4 and 2-2 are also shown.

TABLE 5

Battery shape: laminate film type
Anode active material: silicon (electron beam evaporation)
Coating of anode: dilithium sulfopropionate

| | ELECTROLYTIC SOLUTION | | | | | DISCHARGE CAPACITY RETENTION RATIO (%) | INITIAL DISCHARGE CAPACITY (mAh) |
|---|---|---|---|---|---|---|---|
| | ELECTROLYTE SALT | | SOLVENT (WT %) | | | | |
| | | | EC | DEC | FEC | | |
| EXAMPLE 1-4 | LiPF$_6$ 1 mol/kg | | 30 | 70 | — | 58 | 799 |
| EXAMPLE 4-1 | LiPF$_6$ 0.9 mol/kg | CHEMICAL FORMULA 14(6) 0.1 mol/kg | | | | 65 | 801 |
| EXAMPLE 4-2 | | CHEMICAL FORMULA 15(2) 0.1 mol/kg | | | | 66 | 803 |
| EXAMPLE 2-2 | LiPF$_6$ 1 mol/kg | | — | 70 | 30 | 82 | 802 |
| EXAMPLE 4-3 | LiPF$_6$ 0.9 mol/kg | LiBF$_4$ 0.1 mol/kg | | | | 82 | 802 |
| EXAMPLE 4-4 | | CHEMICAL FORMULA 19(2) 0.1 mol/kg | | | | 83 | 800 |

As shown in Table 5, in Examples 4-1 to 4-4 in which as the electrolyte salt, a predetermined compound or the like was included with lithium hexafluorophosphate, a discharge capacity retention ratio equal to or higher than that in Example 1-4 and 2-2 was obtained. Therefore, it was confirmed that when the electrolytic solution included the compound represented by Chemical Formula 11, the compound represented by Chemical Formula 12, lithium tetrafluoroborate, or the compound represented by Chemical Formula 17 as the electrolyte salt, cycle characteristic tended to be improved.

In the description, the discharge capacity retention ratio in the case where the electrolytic solution included lithium perchlorate, lithium hexafluoroarsenate, the compound represented by Chemical Formula 13, the compound represented by Chemical Formula 16 or the compound represented by Chemical Formula 18 as the electrolyte salt was not shown; however, it was confirmed that when the discharge capacity retention ratio in that case was determined, the cycle characteristics tended to be improved.

Example 5-1

A secondary battery was formed as in the case of Example 2-2, except that lithium fluoride (LiF) as an alkali metal salt was added to a solution including dilithium sulfopropionate, and the coating 34C was formed through the use of the solution. When the coating 34C was formed, after lithium fluoride was dissolved in a 3-wt % solution of dilithium sulfopropionate until lithium fluoride became saturated, the anode current collector 34A on which the anode active material layer 34B was arranged was immersed in the solution.

Example 5-2

A secondary battery was formed as in the case of Example 2-2, except that as shown in FIG. 10, the oxide coating 34D was formed between the anode active material layer 34B and the coating 34C. When the oxide coating 34D was formed, a solution in which a boric acid was dissolved as an anion trapping agent in a hexafluorosilicic acid was prepared, and the anode current collector 34A on which the anode active material layer 34B was arranged was immersed in the solution for 3 hours to deposit silicon oxide ($SiO_2$) on the surface of the anode active material layer 34B, and then the anode active material layer 34 was rinsed and then dried under reduced pressure.

Example 5-3

A secondary battery was formed as in the case of Example 5-2, except that after the oxide coating 34D was formed, cobalt plating was adhered to the surface of the oxide coating 34D. In this case, after the oxide coating 34D was formed as in the case of Example 5-2, cobalt was deposited on both sides of the anode current collector 34A by an electrolytic plating method while supplying air to a plating bath to form a metal, thereby the anode active material layer 34B was formed. At that time, a cobalt plating solution of Japan Pure Chemical Co., Ltd. was used as a plating solution, and the current density was 2 $A/dm^2$ to 5 $A/dm^2$, and the plating rate was 10 nm/s.

Comparative Examples 5-1, 5-2

Secondary batteries were formed as in the case of Examples 5-2 and 5-3, except that the coating 34C was not formed.

When a cycle test was performed on each of the secondary batteries of Examples 5-1 to 5-3 and Comparative Examples 5-1 and 5-2 to determine the discharge capacity retention ratio and the initial discharge capacity, results shown in Table 6 were obtained. In Table 6, data of Example 2-2 is also shown.

TABLE 6

Battery shape: laminate film type
Anode active material: silicon (electron beam evaporation)
Electrolyte salt: $LiPF_6$ (1 mol/kg)

| | ANODE | COATING | | SOLVENT OF ELECTROLYTIC SOLUTION (WT %) | | DISCHARGE CAPACITY RETENTION RATIO (%) | INITIAL DISCHARGE CAPACITY (mAh) |
|---|---|---|---|---|---|---|---|
| | | | | DEC | FEC | | |
| EXAMPLE 2-2 | dilithium sulfopropionate | — | — | 70 | 30 | 82 | 802 |
| EXAMPLE 5-1 | | LiF | — | | | 83 | 780 |
| EXAMPLE 5-2 | | $SiO_2$ | — | | | 91 | 780 |
| EXAMPLE 5-3 | | $SiO_2$ | Co plating | | | 93 | 780 |
| COMPARATIVE EXAMPLE 5-1 | — | $SiO_2$ | — | 70 | 30 | 90 | 803 |
| COMPARATIVE EXAMPLE 5-2 | | $SiO_2$ | Co plating | | | 92 | 785 |

As shown in Table 6, in Examples 5-1 to 5-3 in which in addition to the coating 34C of dilithium sulfopropionate, LiF, $SiO_2$ or $SiO_2$ and Co plating were included, a higher discharge capacity retention ratio than that in Example 2-2 in which only the coating 34C of dilithium sulfopropionate was included was obtained. Moreover, it was confirmed from a comparison between Example 5-2 and Comparative Example 5-1 and a comparison between Example 5-3 and Comparative Example 5-2 that when the coating included dilithium sulfopropionate, the discharge capacity retention ratio was improved.

Example 6-1

A secondary battery was formed as in the case of Example 1-3, except that as a solvent, succinic anhydride (SCAH) was added. At that time, the concentration in the electrolytic solution was 5 wt %.

Comparative Examples 6-1

A secondary battery was formed as in the case of Example 1-4, except that the coating 34C was not formed, and dilithium sulfopropionate was added to the solvent.

Comparative Examples 6-2

A secondary battery was formed as in the case of Example 1-3, except that the coating 34C was not formed, and SCAH was added to the solvent.

When a cycle test was performed on each of the secondary batteries of Example 6-1 and Comparative Examples 6-1 and 6-2 to determine the discharge capacity retention ratio and the initial discharge capacity, results shown in Table 7 were obtained. In Table 7, data of Example 1-4 and Comparative Examples 1-1 are also shown.

TABLE 7

Battery shape: laminate film type
Anode active material: silicon (electron beam evaporation)
Electrolyte salt: LiPF$_6$ (1 mol/kg)

| | ANODE COATING | SOLVENT OF ELECTROLYTIC SOLUTION (WT %) | | | DISCHARGE CAPACITY RETENTION RATIO (%) | INITIAL DISCHARGE CAPACITY (mAh) |
|---|---|---|---|---|---|---|
| | | EC | DEC | OTHERS | | |
| EXAMPLE 1-4 | dilithium sulfopropionate | 30 | 70 | — | 58 | 799 |
| EXAMPLE 6-1 | dilithium sulfopropionate | | | SCAH (5 wt %) | 60 | 797 |
| COMPARATIVE EXAMPLE 1-1 | — | 30 | 70 | — | 30 | 798 |
| COMPARATIVE EXAMPLE 6-1 | | | | dilithium sulfopropionate (less than 0.5 wt %) | 29 | 800 |
| COMPARATIVE EXAMPLE 6-2 | | | | SCAH (5 wt %) | 34 | 715 |

As shown in Table 7, in Example 6-1 in which SCAH was added as the solvent, the discharge capacity retention ratio was higher than that in Example 1-4 in which SCAH was not added. Moreover, it was confirmed from a comparison between Comparative Examples 1-1 and 6-1 that even in the case where dilithium sulfopropionate was added to the solvent of the electrolyte solution, the discharge capacity retention ratio was not improved. Further, it was confirmed from a comparison between Comparative Examples 1-1 and 6-2 that when SCAH was added to the solvent of the electrolyte solution, the discharge capacity retention ratio was slightly increased; however, it was confirmed that when a coating including dilithium sulfopropionate was arranged as in the case of Example 6-1, the discharge capacity retention ratio was remarkably improved.

Example 7

A secondary battery was formed as in the case of Example 1-3, except that the anode active material layer 34B was formed by a sintering method instead of an evaporation method. When the anode active material layer 34B was formed, at first, after 95 parts by weight of silicon powder with an average diameter of 1 μm as an anode active material and 5 parts by weight of polyimide as a binder were mixed to form an anode mixture, the anode mixture was dispersed in N-methyl-2-pyrrolidone to form paste-form anode mixture slurry. After that, the anode mixture slurry was uniformly applied to the anode current collector 34A made of copper foil (with a thickness of 18 μm), and dried, and then the anode mixture slurry was pressurized, and was heated in a vacuum atmosphere at 400° C. for 12 hours.

Comparative Example 7

A secondary battery was formed by the same steps as those in Example 7, except that the coating 34C was not formed.

When the cycle characteristics of the secondary batteries of Example 7 and Comparative Example 7 were determined, results shown in Table 8 were obtained.

TABLE 8

Battery shape: laminate film type
Anode active material: silicon (sintering)
Electrolyte salt: LiPF$_6$ (1 mol/kg)

| | ANODE COATING | SOLVENT OF ELECTROLYTIC SOLUTION (WT %) | | DISCHARGE CAPACITY RETENTION RATIO (%) |
|---|---|---|---|---|
| | | EC | DEC | |
| EXAMPLE 7 | dilithium sulfopropionate | 30 | 70 | 48 |
| COMPARATIVE EXAMPLE 7 | — | 30 | 70 | 29 |

As shown in Table 8, in Example 7 in which the coating 34C was formed, the discharge capacity retention ratio was higher than that in Comparative Example 7 in which the coating 34C was not formed. Therefore, it was confirmed that even in the case where the anode active material layer including silicon as an anode active material was formed by a sintering method, when the coating 34C including the metal salt represented by Chemical Formula 3 was included, cycle characteristics were improved.

Also in the case where the coating 34C including the metal salt of oxocarbonic acid was arranged on the anode active material layer 34B which was formed by a sintering method, the same tendency was shown.

In each of the above-described examples, the laminate film type secondary battery was described; however, in a cylindrical type secondary battery and a coin type secondary battery, the same tendency as that in the laminate film type secondary battery was confirmed. More specifically, it was confirmed that independent of the method of forming the anode active material layer, the kind of the anode active material, the battery configuration or the like, when the anode included a coating including the metal salt represented by Chemical Formula 3 or the metal salt of oxocarbonic acid, it became possible to improve cycle characteristics.

Although the present invention is described referring to the embodiment and the examples, the invention is not limited to the embodiment and the examples, and may be variously modified. The application of the anode of the invention is not limited to batteries, and the anode may be applied to any other electrochemical devices in addition to the batteries. As the other application, for example, a capacitor or the like is cited.

Moreover, in the above-described embodiment and the above-descried examples, the case where the electrolytic solution or the gel electrolyte in which the polymer compound holds the electrolytic solution is used as the electrolyte of the battery of the invention is described; however, any other kind of electrolyte may be used. Examples of the electrolyte include a mixture of an ion-conducting inorganic compound such as ion-conducting ceramic, ion-conducting glass or ionic crystal and an electrolytic solution, a mixture of another inorganic compound and an electrolytic solution, a mixture of the inorganic compound and a gel electrolyte, and the like.

Further, in the above-described embodiment and the above-described examples, as the battery of the invention, the lithium-ion secondary battery in which the capacity of the anode is represented based on insertion and extraction of lithium is used, and the lithium metal secondary battery in which the capacity of an anode is represented by a capacity based on precipitation and dissolution of lithium is described; however, the invention is not limited to them. The battery of the invention is applicable to a secondary battery in which the charge capacity of an anode material capable of inserting and extracting lithium is smaller than the charge capacity of a cathode, thereby the capacity of the anode includes a capacity based on insertion and extraction of lithium and a capacity based on precipitation and dissolution of lithium, and is represented by the sum of them in the same manner.

In the above-described embodiment and the above-described examples, the case where lithium is used as an electrode reactant is described; however, any other Group 1A element in the short form of the periodic table of the elements such as sodium (Na) or potassium (K), a Group 2A element in the short form of the periodic table of the elements such as magnesium or calcium (Ca), or any other light metal such as aluminum may be used. Also in this case, as the anode active material, the anode material described in the above-described embodiment may be used.

In the above-described embodiment and the above-described examples, the case where the battery has a cylindrical type, a laminate film type or a coin type, and the case where the battery element has a spirally wound configuration are described as examples; however, the battery of the invention is applicable to the case where a battery has any other shape such as a prismatic type, or a button type or the case where the battery element has any other configuration such as a laminate configuration in the same manner. In addition, the invention is applicable to not only the secondary batteries but also other kinds of batteries such as primary batteries.

It should be understood by those skilled in the art that various modifications, combinations, sub-combinations and alterations may occur depending on design requirements and other factors insofar as they are within the scope of the appended claims or the equivalents thereof.

What is claimed is:

1. A battery comprising:
a cathode;
an anode; and
an electrolytic solution,
wherein,
the anode comprises an anode current collector, an anode active material layer on the anode current collector, and a coating on the anode active material layer, and
the coating comprises at least one of a metal salt represented by Chemical Formula 3 and a metal salt of oxocarbonic acid,
where Chemical Formula 3 is:

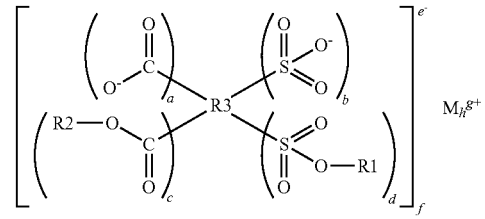

where (i) M represents a metal element, (ii) each of a, b, c and d represent an integer of 0 or more, (iii) the sum of b+d≥2, (iv) the sum of a, b, c and d is an integer of 2 or more, (v) the sum of a and b is an integer of 1 or more, (vi) each of e, f, g and h represent an integer of 1 or more, (vii) each of R1 and R2 represent an alkyl group, an alkenyl group, an alkynyl group, a trialkylsilyl group or a halogenated group of any of the alkyl group, an alkenyl group, an alkynyl group or trialkylsilyl group, which are the same or different from each other and (viii) R3 represents a hydrocarbon group, and the metal salt of oxocarbonic acid is dilithium squarate.

2. The battery according to claim 1, wherein the metal element is an alkali metal element or an alkaline-earth element.

3. The battery according to claim 1, wherein the coating includes a metal salt of oxocarbonic acid, the oxocarbonic acid including an ester bond.

4. The battery according to claim 1, wherein the metal salt represented by Chemical Formula 3 is dilithium ethanedisulfonate, dilithium propanedisulfonate, dilithium sulfoacetate, dilithium sulfopropionate, dilithium sulfobutanoate, dilithium sulfobenzoate, dilithium succinate, trilithium sulfosuccinate, magnesium ethanedisulfonate, magnesium propanedisulfonate, magnesium sulfoacetate, magnesium sulfopropionate, magnesium sulfobutanoate, magnesium sulfobenzoate, magnesium succinate, trimagnesium disulfosuccinate, calcium ethanedisulfonate, calcium propanedisulfonate, calcium sulfoacetate, calcium sulfopropionate, calcium sulfobutanoate, calcium sulfobenzoate, calcium succinate or tricalcium disulfosuccinate.

5. The battery according to claim 1, wherein the coating includes at least one of an alkali metal salt or an alkaline-earth metal salt.

6. The battery according to claim 1, wherein the anode active material layer comprises at least one of a simple substance of silicon, an alloy of silicon, a compound of silicon, a simple substance of tin, an alloy of tin or a compound of tin.

7. The battery according to claim 1, wherein the electrolytic solution comprises a cyclic carbonate including an unsaturated bond.

8. The cyclic carbonate according to claim 7 wherein the amount of the cyclic carbonate including unsaturated bond is in the electrolytic solution is within a range of of 0.01 wt % to 10.0 wt %, both inclusive.

9. The battery according to claim 1, wherein the electrolytic solution includes at least one of a chain carbonate represented by Chemical Formula 4, or a cyclic carbonate represented by Chemical Formula 5, where Chemical Formula 4 is:

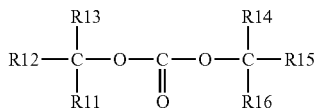

where in Chemical Formula 4 (i) each of R11, R12, R13, R14, R15 and R16 represent a hydrogen group, a halogen group, an alkyl group or a halogenated alkyl group, and may be the same as or different from one another, and (ii) at least one of R11, R12, R13, R14, R15 or R16 is a halogen group or a halogenated alkyl group, and the halogen is at least one kind selected from the group consisting of fluorine (F), chlorine (Cl) and bromine (Br), where Chemical Formula 5 is:

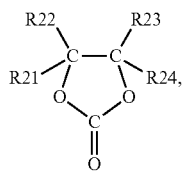

and where in Chemical Formula 5, (i) each of R21, R22, R23 and R24 represent a hydrogen group, a halogen group, an alkyl group or a halogenated alkyl group, and may be the same as or different from one another, and (ii) at least one of R21, R22, R23 or R24 is a halogen group or a halogenated alkyl group, and the halogen is at least one kind selected from the group consisting of fluorine, chlorine and bromine.

10. The battery according to claim 9, wherein the electrolyte solution comprises at least one of fluoromethyl methyl carbonate, bis(fluoromethyl) carbonate difluoromethyl methyl carbonate,4-fluoro-1,3-dioxolane-2-one or 4,5-difluoro-1,3- dioxolane-2-one.

11. The battery according to claim 1, wherein the electrolytic solution includes a sultone.

12. The battery according to claim 1, wherein the electrolytic solution includes an acid anhydride.

13. The battery according to claim 1 further comprising an oxide coating in-between the anode active material layer and the coating.

14. The battery according to claim 13 wherein the oxide coating includes at least one kind of oxide selected from the group consisting of an oxide of silicon, an oxide of germanium and an oxide of tin.

* * * * *